United States Patent
Tsai et al.

(10) Patent No.: US 8,724,238 B2
(45) Date of Patent: May 13, 2014

(54) MONOFOCAL OPTICAL LENS SYSTEM

(75) Inventors: Tsung-Han Tsai, Taichung (TW);
Ming-Ta Chou, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 92 days.

(21) Appl. No.: 13/615,637

(22) Filed: Sep. 14, 2012

(65) Prior Publication Data

US 2013/0235474 A1 Sep. 12, 2013

(30) Foreign Application Priority Data

Mar. 8, 2012 (TW) .............................. 101107894 A

(51) Int. Cl.
*G02B 13/00* (2006.01)

(52) U.S. Cl.
CPC .................................. *G02B 13/0045* (2013.01)
USPC ......................................... 359/764; 359/714

(58) Field of Classification Search
USPC .......... 359/746, 755, 756, 763–770, 708–718
See application file for complete search history.

(56) References Cited

U.S. PATENT DOCUMENTS

| | | | |
|---|---|---|---|
| 7,864,454 B1 * | 1/2011 | Tang et al. | 359/764 |
| 2011/0273611 A1 * | 11/2011 | Matsusaka et al. | 348/345 |
| 2011/0304928 A1 * | 12/2011 | Abe | 359/764 |

FOREIGN PATENT DOCUMENTS

| | | |
|---|---|---|
| JP | 2001-166207 A | 6/2001 |
| JP | 2003-140040 A | 5/2003 |
| JP | 2007-034314 A | 2/2007 |
| JP | 2010-256608 A | 11/2010 |
| TW | 201135304 A1 | 10/2011 |

* cited by examiner

*Primary Examiner* — Ricky Mack
*Assistant Examiner* — Gary O'Neill
(74) *Attorney, Agent, or Firm* — CKC & Partners Co., Ltd.

(57) ABSTRACT

A monofocal optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein at least one of the surfaces thereof is aspheric. The fourth lens element with negative refractive power is made of plastic material, and has a concave object-side surface and a convex image-side surface. The fifth lens element with refractive power is made of plastic material, and has a concave object-side surface, wherein the image-side surface thereof is convex or planar at the paraxial region and is convex at the peripheral region, and the surfaces of the fourth through fifth lens elements are aspheric.

21 Claims, 21 Drawing Sheets

MONOFOCAL OPTICAL LENS SYSTEM

RELATED APPLICATIONS

The application claims priority to Taiwan Application Serial Number 101107894, filed Mar. 8, 2012, which is herein incorporated by reference.

BACKGROUND

1. Technical Field

The present invention relates to a monofocal optical lens system. More in particularly, the present invention relates to a compact monofocal optical lens system applicable to electronic products.

2. Description of Related Art

In recent years, with the popularity of mobile products with camera functionalities, the demand of miniaturized optical lens systems is increasing. The sensor of a conventional photographing camera is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical lens systems have gradually evolved toward the field of higher megapixels, there is an increasing demand for compact optical lens systems featuring better image quality.

A conventional compact optical lens system employed in a portable electronic product mainly adopts a four-element lens structure such as the one disclosed in U.S. Pat. No. 7,869,142. Due to the popularity of mobile products with high-end specifications, such as smart phones and PDAs (Personal Digital Assistants), the requirements for high resolution and image quality of modern compact optical lens systems increases significantly. However, the conventional four-element lens structure cannot satisfy these requirements of the compact optical lens system.

Other conventional compact optical lens systems with five-element lens structure such as the ones disclosed in U.S. Pat. Nos. 8,000,030 and 8,000,031 enhance image quality and resolving power. However, the shape of the image-side surface of the fifth lens element cannot reduce the angle at which the incident light projects onto the image sensor. Therefore, the photosensitivity of the image sensor cannot be increased, and the image quality of the optical lens system cannot be retained.

SUMMARY

According to one aspect of the present disclosure, a monofocal optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein at least one of an object-side surface and an image-side surface of the third lens element is aspheric. The fourth lens element with negative refractive power is made of plastic material, and has a concave object-side surface and a convex image-side surface, wherein the object-side surface and the image-side surface of the fourth lens element are aspheric. The fifth lens element with refractive power is made of plastic material, and has a concave object-side surface, wherein the object-side surface and an image-side surface of the fifth lens element are aspheric; the image-side surface of the fifth lens element is convex or planar at a paraxial region and is convex at a peripheral region. The monofocal optical lens system further includes a stop. When an axial distance between the object-side surface of the first lens element and the stop is Dr1s, an axial distance between the object-side surface of the first lens element and an image-side surface of the second lens element is Dr1r4 a curvature radius of the object-side surface of the fifth lens element is R9, and a curvature radius of the image-side surface of the fifth lens element is R10, the following relationships are satisfied:

$$-0.2 < Dr1s/Dr1r4 < 0.9; \text{ and}$$

$$0 \leq R9/R10 < 0.30.$$

According to another aspect of the present disclosure, a monofocal optical lens system includes, in order from an object side to an image side, a first lens element, a second lens element, a third lens element, a fourth lens element and a fifth lens element. The first lens element with positive refractive power has a convex object-side surface. The second lens element has negative refractive power. The third lens element has refractive power, wherein at least one of an object-side surface and an image-side surface of the third lens element is aspheric. The fourth lens element with negative refractive power is made of plastic material, and has a concave object-side surface and a convex image-side surface, wherein the object-side surface and the image-side surface of the fourth lens element are aspheric. The fifth lens element with refractive power is made of plastic material, and has a concave object-side surface, wherein the object-side surface and an image-side surface of the fifth lens element are aspheric; the image-side surface of the fifth lens element is convex or planar at a paraxial region and is convex at a peripheral region. The monofocal optical lens system further includes a stop. When an axial distance between the object-side surface of the first lens element and the stop is Dr1s, an axial distance between the object-side surface of the first lens element and an image-side surface of the second lens element is Dr1r4, a curvature radius of the object-side surface of the third lens element is R5, and a curvature radius of the image-side surface of the third lens element is R6, the following relationships are satisfied:

$$-0.2 < Dr1s/Dr1r4 < 0.9; \text{ and}$$

$$0.6 < (R5+R6)/(R5-R6) < 3.0.$$

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
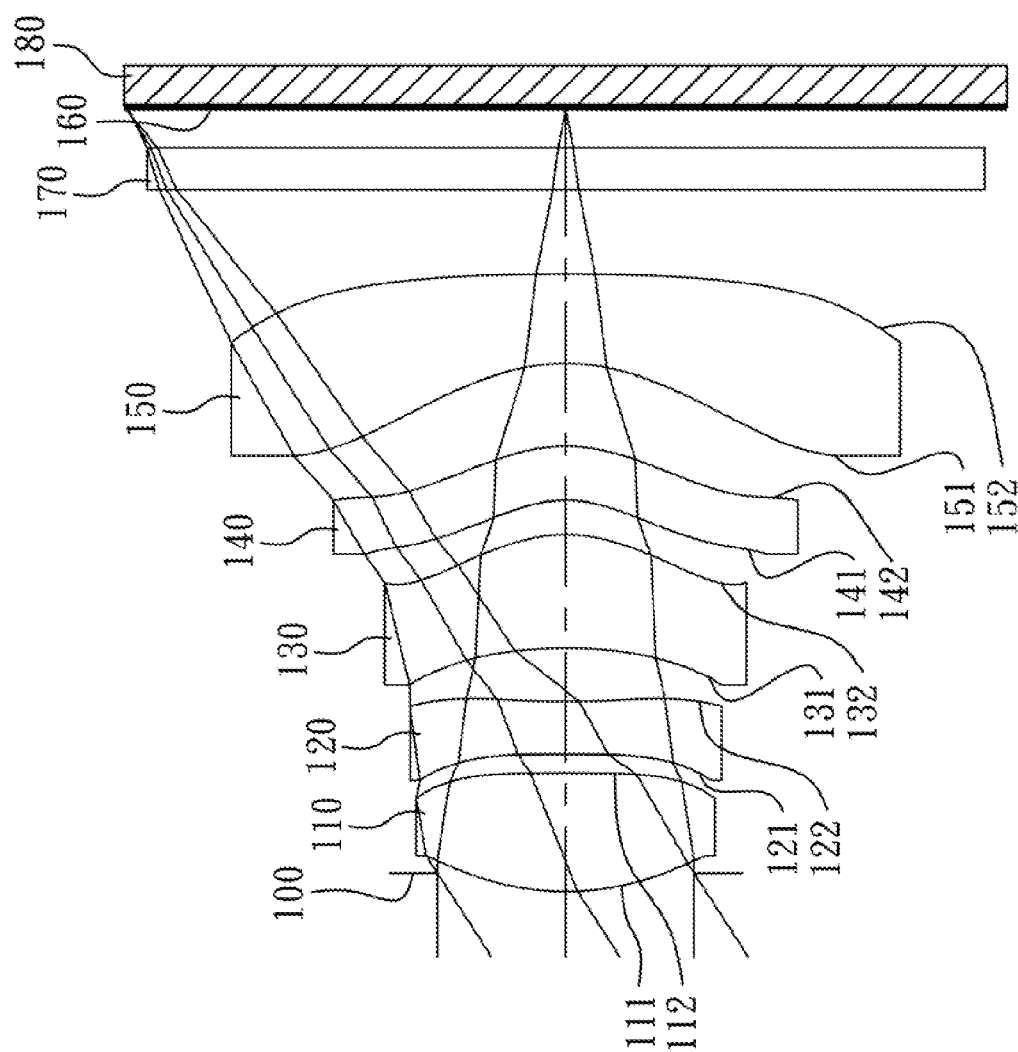
FIG. 1 is a schematic view of a monofocal optical lens system according to the 1st embodiment of the present disclosure.

A monofocal optical lens system includes, in order from an object side to an image side, a first lens element, a second lens element, a third lens element, a fourth lens element and a fifth lens element. The monofocal optical lens system further includes an image sensor located on an image plane.

The first lens element with positive refractive power has a convex object-side surface, so that the positive refractive power of the first lens element can be adjusted for reducing the total track length of the monofocal optical lens system.

The second lens element with negative refractive power can correct the aberration generated from the first lens element with positive refractive power.

The third lens element has positive refractive power, so that the refractive power of the first lens element can be evenly distributed for preventing the spherical aberration from being excessively large, and thereby the sensitivity of the monofocal optical lens system is reduced effectively. The third lens element has a concave object-side surface and a convex image-side surface, so that the positive refractive power of the third lens element can be properly adjusted.

The fourth lens element with negative refractive power has a concave object-side surface and a convex image-side surface, so that that astigmatism and the high order aberration of the monofocal optical lens system can be favorably corrected.

The fifth lens element with negative refractive power has a concave object-side surface, and an image-side surface which is convex or planar at a paraxial region and is convex at a peripheral region. Therefore, the angle at which the incident light projects onto the image sensor from the off-axis field can be effectively reduced, and thereby the image quality and the manufacturability of the monofocal optical lens system are more stable.

The monofocal optical lens system further includes a stop, such as an aperture stop. An axial distance between the object-side surface of the first lens element and an image-side surface of the second lens element is Dr1r4, an axial distance between the object-side surface of the first lens element and the aperture stop is Dr1s, wherein when the aperture stop is located between the image-side surface of the first lens element and the image plane, Dr1s is positive; when the aperture stop is located between the object-side surface of the first lens element and the object, Dr1s is negative. Dr1s and Dr1r4 satisfy the following relationship:

$$-0.2 < Dr1s/Dr1r4 < 0.9.$$

By such arrangement, the exit pupil of the monofocal optical lens system can be far away from the image plane, so that the light will be projected onto the image sensor with a relatively small incident angle which is the telecentric feature of the image side. The photosensitivity of the image sensor can thereby be enhanced and the total track length of the monofocal optical lens system can thereby be reduced.

When a curvature radius of the object-side surface of the fifth lens element is R9, and a curvature radius of the image-side surface of the fifth lens element is R10, the following relationship is satisfied:

$$0 \leq R9/R10 < 0.30.$$

Therefore, the photosensitivity of the image sensor can be enhanced and the total track length of the monofocal optical lens system can be reduced effectively by adjusting the curvature of the object-side and image-side surfaces of the fifth lens element.

R9 and R10 can further satisfy the following relationship:

$$0 \leq R9/R10 < 0.15.$$

At least four lens elements of the first through fifth lens elements have a surface being concave at the paraxial region and the other surface being convex at the paraxial region, that is, a meniscus-shaped lens element. Therefore, the astigmatism of the monofocal optical lens system can be favorably corrected.

When an axial distance between the object-side surface of the first lens element and the image plane is TTL, and a maximum image height of the monofocal optical lens system is ImgH, the following relationship is satisfied:

$$TTL/ImgH < 2.0.$$

Therefore, the monofocal optical lens system with short total track length can maintain the compact size for portable electronic products.

When a focal length of the fourth lens element is f4, and a focal length of the fifth lens element is f5, the following relationship is satisfied:

$$0 < f5/f4 < 0.80.$$

Therefore, the refractive power of the fourth lens element and the fifth lens element are proper for reducing the sensitivity of the monofocal optical lens system.

f5 and f4 can further satisfy the following relationship:

$$0 < f5/f4 < 0.50.$$

When a sum of the central thickness from the first through fifth lens elements is ΣCT, and an axial distance between the object-side surface of the first lens element and the image-side surface of the fifth lens element is TD, the following relationship is satisfied:

$$0.55 < \Sigma CT/TD < 0.85.$$

By such arrangement, the total track length of the monofocal optical lens system can thereby be reduced so as to maintain the compact size of the monofocal optical lens system.

When the axial distance between the object-side surface of the first lens element and the image-side surface of the fifth lens element is TD, the following relationship is satisfied:

$$2.5 \text{ mm} < TD < 3.8 \text{ mm}.$$

Therefore, it is favorable for keeping the monofocal optical lens system compact.

When a curvature radius of the object-side surface of the third lens element is R5, and a curvature radius of the image-side surface of the third lens element is R6, the following relationship is satisfied:

$$0.6 < (R5+R6)/(R5-R6) < 3.0.$$

Therefore, the sensitivity of the monofocal optical lens system can be reduced by adjusting the surface curvature of the third lens element.

When an Abbe number of the first lens element is V1, and an Abbe number of the second lens element is V2, the following relationship is satisfied:

$$2.2 < V1/V2 < 3.0.$$

Therefore, the chromatic aberration of the monofocal optical lens system can be corrected.

According to the monofocal optical lens system of the present disclosure, the lens elements thereof can be made of glass or plastic material. When the lens elements are made of glass material, the distribution of the refractive power of the monofocal optical lens system may be more flexible to design. When the lens elements are made of plastic material, the production cost can be effectively reduced. Furthermore, the surface of each lens element can be aspheric, so that it is easier to make the surface into non-spherical shapes. As a result, more controllable variables are obtained, and the aberration is reduced, as well as the number of required lens elements can be reduced while constructing an optical system. The total track length of the monofocal optical lens system can thereby be reduced.

According to the monofocal optical lens system of the present disclosure, when the lens element has a convex surface, it indicates that the paraxial region of the surface is convex; and when the lens element has a concave surface, it indicates that the paraxial region of the surface is concave.

According to the monofocal optical lens system of the present disclosure, there can be at least one stop provided, such as an aperture stop, a glare stop, or a field stop. Said glare stop or said field stop is allocated for reducing the stray light and thereby improving the image resolution thereof. Furthermore, an aperture stop can be configured as a front stop or a middle stop. A front stop can provide a longer distance from an exit pupil of the system to an image plane and thereby the generated telecentric effect improves the image-sensing efficiency of an image sensor. A middle stop is favorable for enlarging the field of view of the system and thereby provides a wider field of view for the same.

According to the above description of the present disclosure, the following 1st-10th specific embodiments are provided for further explanation.

1st Embodiment

Figure 2:
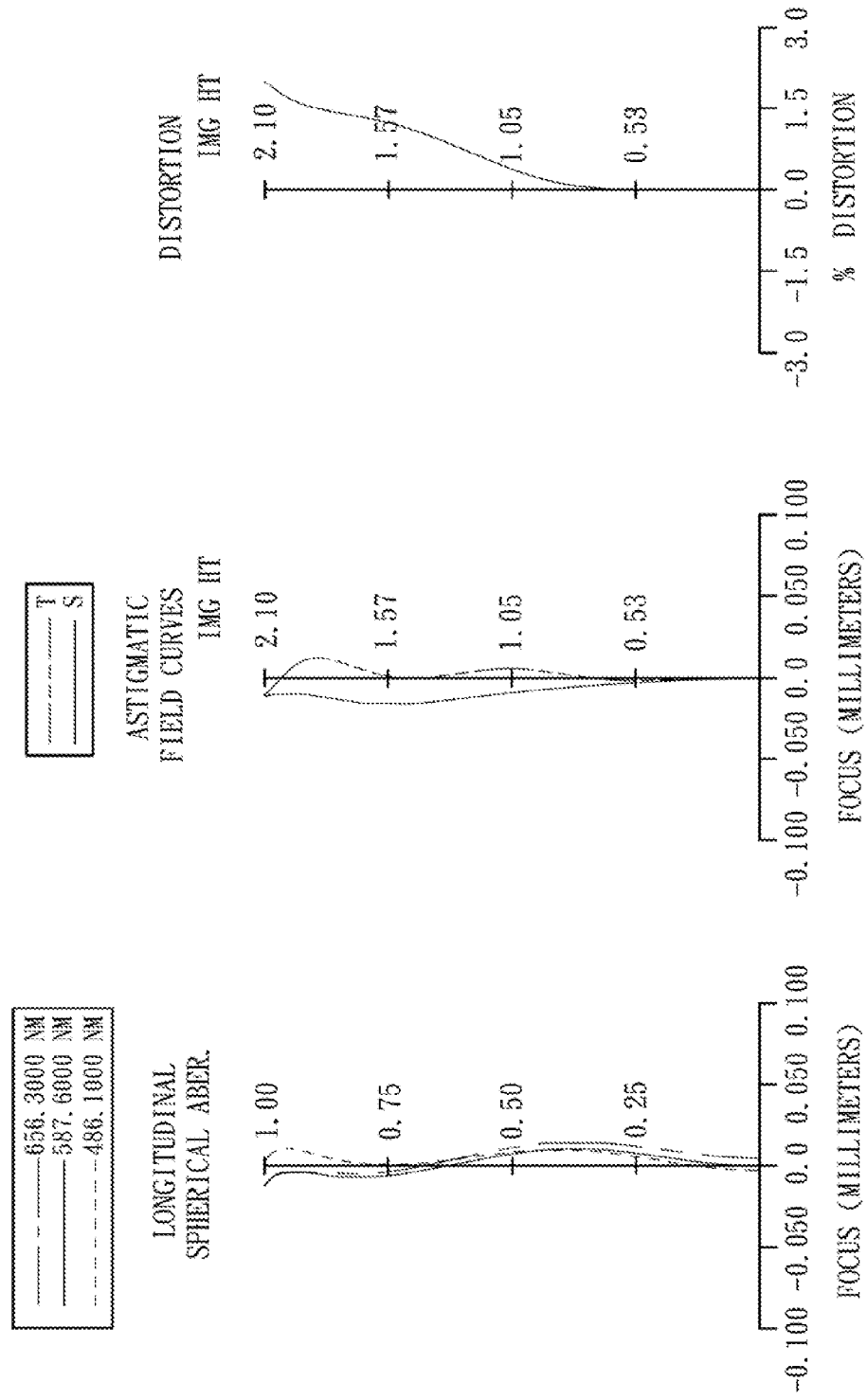
FIG. 2 shows spherical aberration curves, astigmatic field curves and a distortion curve of the monofocal optical lens system according to the 1st embodiment.

FIG. 1 is a schematic view of a monofocal optical lens system according to the 1st embodiment of the present disclosure. FIG. 2 shows spherical aberration curves, astigmatic field curves and a distortion curve of the monofocal optical lens system according to the 1st embodiment. In FIG. 1, the monofocal optical lens system includes, in order from an object side to an image side, an aperture stop 100, the first lens element 110, the second lens element 120, the third lens element 130, the fourth lens element 140, the fifth lens element 150, an IR-cut filter 170, an image plane 160 and an image sensor 180.

The first lens element 110 with positive refractive power has a convex object-side surface 111 and a convex image-side surface 112 and is made of plastic material. The object-side surface 111 and the image-side surface 112 of the first lens element 110 are aspheric.

The second lens element 120 with negative refractive power has a concave object-side surface 121 and a concave image-side surface 122, and is made of plastic material. The object-side surface 121 and the image-side surface 122 of the second lens element 120 are aspheric.

The third lens element 130 with positive refractive power has a concave object-side surface 131 and a convex image-side surface 132, and is made of plastic material. The object-side surface 131 and the image-side surface 132 of the third lens element 130 are aspheric.

The fourth lens element 140 with negative refractive power has a concave object-side surface 141 and a convex image-side surface 142, and is made of plastic material. The object-side surface 141 and the image-side surface 142 of the fourth lens element 140 are aspheric.

The fifth lens element 150 with negative refractive power has a concave object-side surface 151 and a convex image-side surface 152, and is made of plastic material. The object-side surface 151 and the image-side surface 152 of the fifth lens element 150 are aspheric. Furthermore, the image-side 152 of the fifth lens element 150 is convex at the paraxial region and the peripheral region thereof.

The IR-cut filter 170 is made of glass, and located between the fifth lens element 150 and the image plane 160, and will not affect the focal length of the monofocal optical lens system.

The equation of the aspheric surface profiles of the aforementioned lens elements of the 1st embodiment is expressed as follows:

$$X(Y) = (Y^2/R)/\left(1 + sqrt\left(1 - (1+k) \times (Y/R)^2\right)\right) + \sum_i (Ai) \times (Y^i),$$

Wherein,

X is the relative distance between a point on the aspheric surface spaced at a distance Y from the optical axis and the tangential plane at the aspheric surface vertex on the optical axis;

Y is the distance from the point on the curve of the aspheric surface to the optical axis;

R is the curvature radius;

k is the conic coefficient; and

Ai is the i-th aspheric coefficient.

In the monofocal optical lens system according to the 1st embodiment, when a focal length of the monofocal optical lens system is f, an f-number of the monofocal optical lens system is Fno, and half of the maximal field of view is HFOV, these parameters have the following values:

f=3.18 mm;

Fno=2.60; and

HFOV=32.9 degrees.

In the monofocal optical lens system according to the 1st embodiment, when an Abbe number of the first lens element 110 is V1, and an Abbe number of the second lens element 120 is V2, the following relationship is satisfied:

$V1/V2=2.61$.

In the monofocal optical lens system according to the 1st embodiment, when a sum of the central thickness from the first through fifth lens elements (110-150) is ΣCT, and an axial distance between the object-side surface 111 of the first lens element 110 and the image-side surface 152 of the fifth lens element 150 is TD, the following relationship is satisfied:

$\Sigma CT/TD=0.69$.

Figure 21:
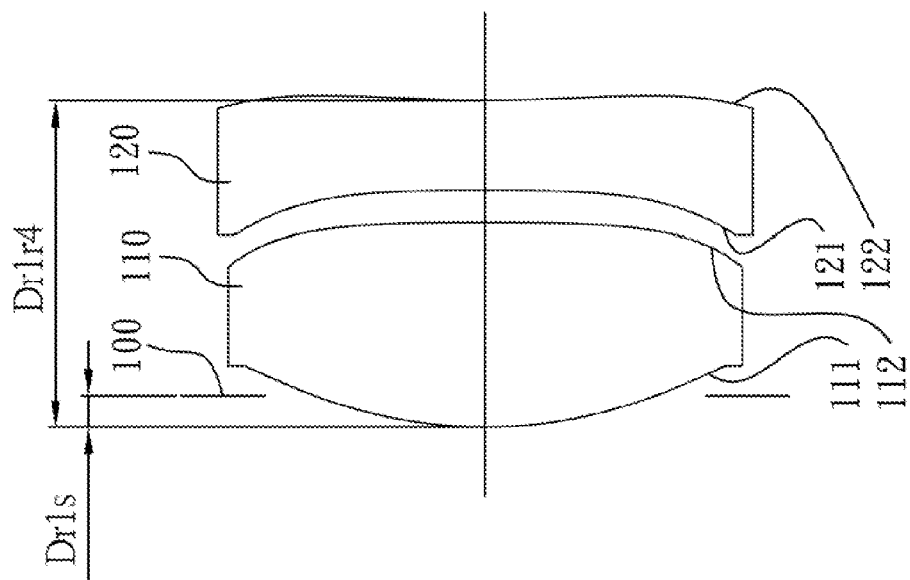
FIG. 21 is a schematic view of the aperture stop, the first lens element and the second lens element of the monofocal optical lens system of FIG. 1.

FIG. 21 is a schematic view of the aperture stop 100, the first lens element 110 and the second lens element 120 of the monofocal optical lens system of FIG. 1. In FIG. 21, an axial distance between the object-side surface 111 of the first lens element 110 and an image-side surface 122 of the second lens element 120 is Dr1r4, an axial distance between the object-side surface 111 of the first lens element 110 and the aperture stop 100 is Dr1s, wherein when the aperture stop 100 is located between the image-side surface 112 of the first lens element 110 and the image plane 160, Dr1s is positive; when the aperture stop 100 is located between the object-side surface 111 of the first lens element 110 and the object, Dr1s is negative. Dr1s and Dr1r4 satisfy the following relationship:

$Dr1s/Dr1r4=0.10$.

In the monofocal optical lens system according to the 1st embodiment, when the axial distance between the object-side surface 111 of the first lens element 110 and the image-side surface 152 of the fifth lens element 150 is TD, the following relationship is satisfied:

$TD=2.95$ mm.

In the monofocal optical lens system according to the 1st embodiment, when a curvature radius of the object-side surface 131 of the third lens element 130 is R5, and a curvature radius of the image-side surface 132 of the third lens element 130 is R6, the following relationship is satisfied:

$(R5+R6)/(R5-R6)=1.89$.

In the monofocal optical lens system according to the 1st embodiment, when a curvature radius of the object-side surface 151 of the fifth lens element 150 is R9, and a curvature radius of the image-side surface 152 of the fifth lens element 150 is R10, the following relationship is satisfied:

$R9/R10=0.07$.

In the monofocal optical lens system according to the 1st embodiment, when a focal length of the fourth lens element 140 is f4, and a focal length of the fifth lens element 150 is f5, the following relationship is satisfied:

$f5/f4=0.23$.

In the monofocal optical lens system according to the 1st embodiment, when an axial distance between the object-side surface 111 of the first lens element 110 and the image plane 160 is TTL, and a maximum image height of the monofocal optical lens system is ImgH which here is a half of the diagonal length of the effective photosensitive area of the image sensor 180 on the image plane 160, and the following relationship is satisfied:

$TTL/ImgH=1.75$.

The detailed optical data of the 1st embodiment are shown in Table 1 and the aspheric surface data are shown in Table 2 below.

TABLE 1

1st Embodiment
f = 3.18 mm, Fno = 2.60, HFOV = 32.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.088 | | | | |
| 2 | Lens 1 | 1.299 (ASP) | 0.568 | Plastic | 1.544 | 55.9 | 2.21 |
| 3 | | −13.642 (ASP) | 0.089 | | | | |
| 4 | Lens 2 | −17.323 (ASP) | 0.250 | Plastic | 1.650 | 21.4 | −5.08 |
| 5 | | 4.097 (ASP) | 0.257 | | | | |
| 6 | Lens 3 | −2.335 (ASP) | 0.542 | Plastic | 1.544 | 55.9 | 1.71 |
| 7 | | −0.719 (ASP) | 0.163 | | | | |
| 8 | Lens 4 | −0.592 (ASP) | 0.256 | Plastic | 1.640 | 23.3 | −8.70 |
| 9 | | −0.775 (ASP) | 0.395 | | | | |
| 10 | Lens 5 | −0.992 (ASP) | 0.430 | Plastic | 1.535 | 56.3 | −2.03 |
| 11 | | −13.736 (ASP) | 0.400 | | | | |
| 12 | IR-cut filter | Plano | 0.200 | Glass | 1.517 | 64.2 | — |
| 13 | | Plano | 0.197 | | | | |
| 14 | Image | Plano | — | | | | |

Note:
Reference wavelength (d-line) is 587.6 nm.

TABLE 2

Aspheric Coefficients

| | Surface # | | | | |
|---|---|---|---|---|---|
| | 2 | 3 | 4 | 5 | 6 |
| k = | −7.0470E−03 | −1.0000E+00 | −1.0000E+00 | 5.4626E−01 | 2.4950E+00 |
| A4 = | −2.2453E−02 | −2.6083E−01 | −5.1336E−01 | −3.4540E−01 | −2.3916E−01 |
| A6 = | 1.1095E−01 | −3.8393E−02 | 4.0704E−01 | 3.1495E−01 | 2.7084E−01 |
| A8 = | −6.3936E−01 | −4.3291E−01 | −1.4142E+00 | −6.6282E−01 | 1.5890E−01 |
| A10 = | 9.8832E−01 | −4.3830E−01 | 1.4933E+00 | 1.1271E−01 | −5.6087E−01 |
| A12 = | −6.1037E−01 | 1.2908E+00 | 4.0778E−01 | 1.1102E+00 | −1.2634E+00 |
| A14 = | −1.6699E+00 | −1.2066E+00 | −4.7902E−01 | −9.8384E−01 | 3.3190E+00 |
| A16 = | | | | | −2.4223E+00 |

| | Surface # | | | | |
|---|---|---|---|---|---|
| | 7 | 8 | 9 | 10 | 11 |
| k = | −4.8961E−01 | −2.1535E+00 | −1.8928E+00 | −2.6868E+00 | −1.0000E+00 |
| A4 = | 7.2839E−01 | 7.5921E−01 | 3.9005E−01 | −4.5202E−02 | −4.8247E−02 |
| A6 = | −1.6983E−01 | −8.6759E−01 | −2.7440E−01 | 1.0374E−01 | 4.4971E−02 |
| A8 = | 1.6416E−01 | 7.8640E−01 | 1.8812E−01 | −8.7060E−02 | −3.9045E−02 |
| A10 = | 3.8698E−01 | −6.2655E−01 | 4.6760E−02 | 4.6668E−02 | 1.4050E−02 |
| A12 = | −2.8700E−01 | 2.2195E−01 | −8.4179E−02 | 2.3573E−02 | −1.5029E−03 |
| A14 = | 2.2753E−01 | 1.9136E−01 | −4.6181E−02 | −3.1052E−02 | −5.4187E−04 |
| A16 = | −1.8756E−02 | −1.9645E−01 | 3.4305E−02 | 7.4959E−03 | 1.4501E−04 |

In Table 1, the curvature radius, the thickness and the focal length are shown in millimeters (mm). Surface numbers 0-14 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. This information related to Table 1 and Table 2 applies also to the Tables for the remaining embodiments, and so an explanation in this regard will not be provided again.

2nd Embodiment

Figure 3:
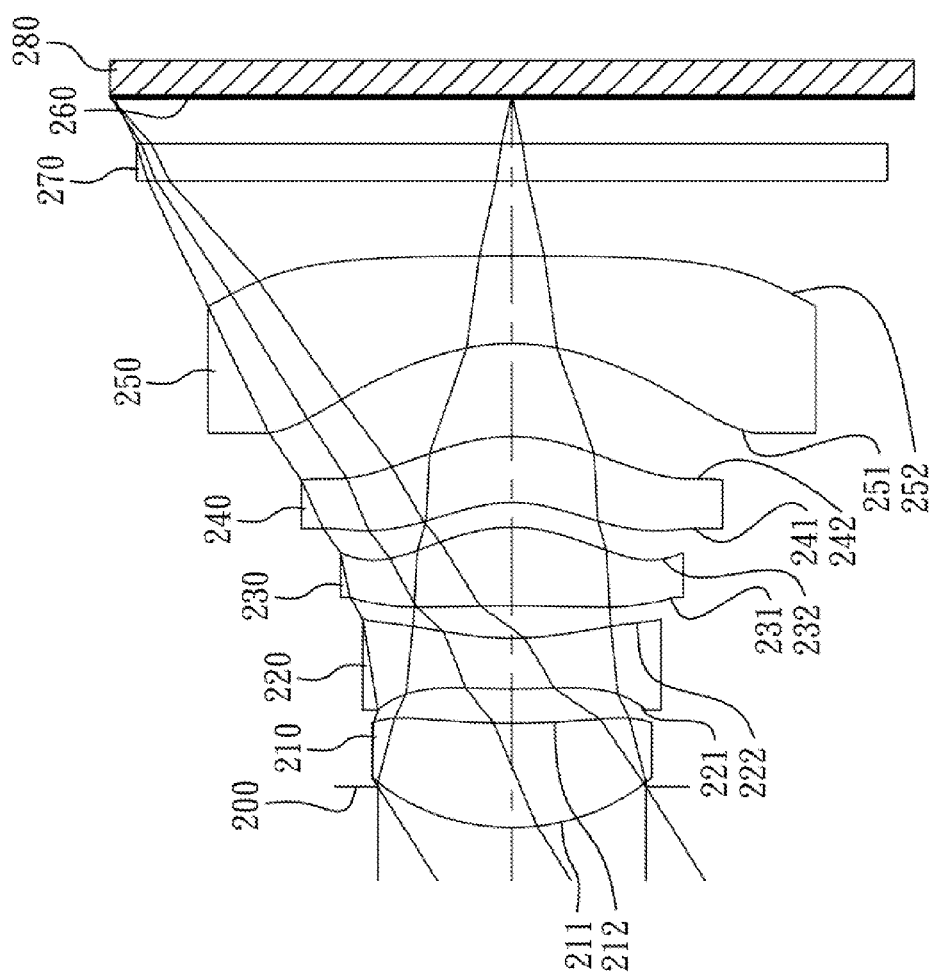
FIG. 3 is a schematic view of a monofocal optical lens system according to the 2nd embodiment of the present disclosure.
Figure 4:
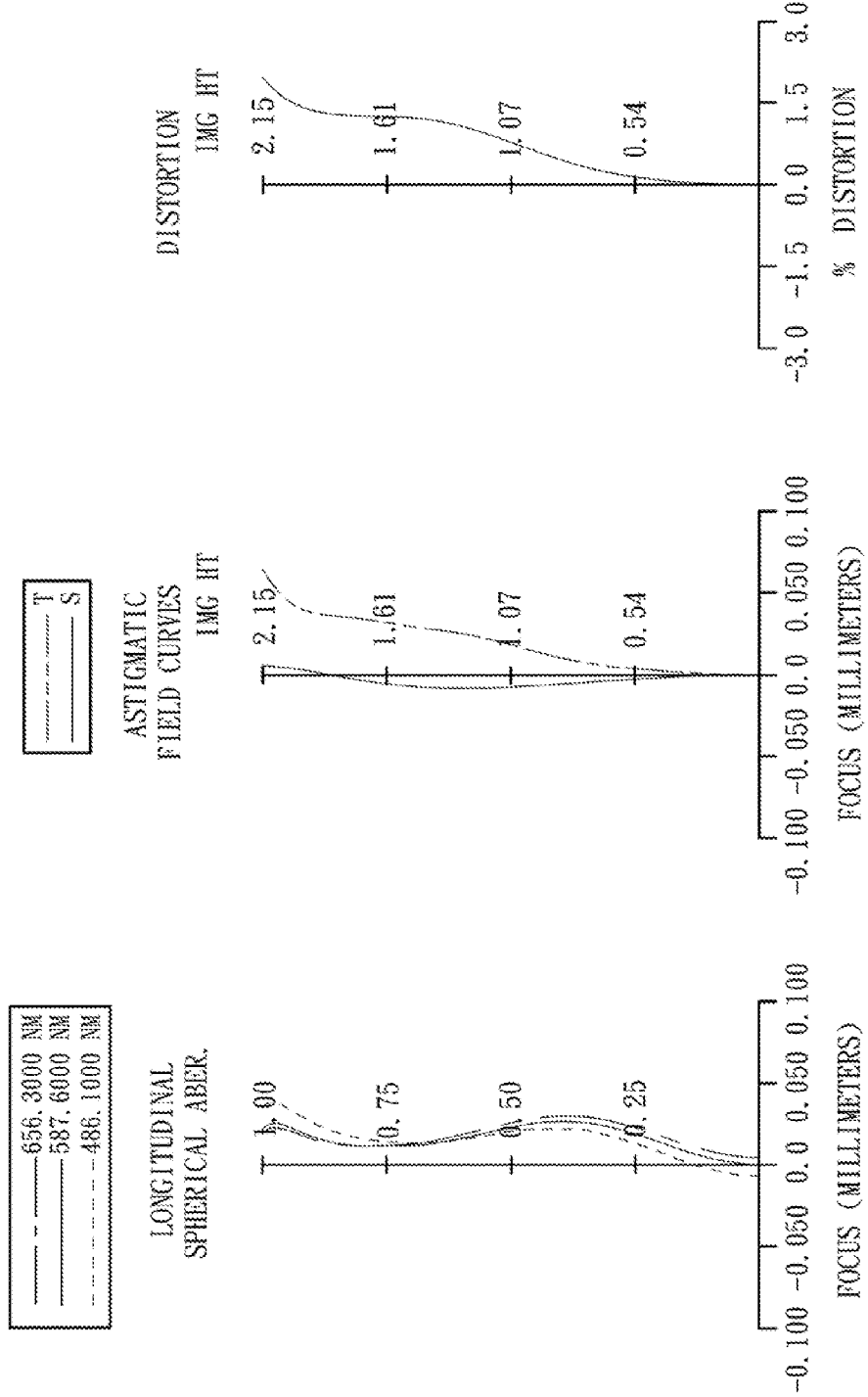
FIG. 4 shows spherical aberration curves, astigmatic field curves and a distortion curve of the monofocal optical lens system according to the 2nd embodiment.

FIG. 3 is a schematic view of a monofocal optical lens system according to the 2nd embodiment of the present disclosure. FIG. 4 shows spherical aberration curves, astigmatic field curves and a distortion curve of the monofocal optical lens system according to the 2nd embodiment. In FIG. 3, the monofocal optical lens system includes, in order from an object side to an image side, an aperture stop 200, the first lens element 210, the second lens element 220, the third lens element 230, the fourth lens element 240, the fifth lens element 250, an IR-cut filter 270, an image plane 260 and an image sensor 280.

The first lens element 210 with positive refractive power has a convex object-side surface 211 and a concave image-side surface 212, and is made of plastic material. The object-side surface 211 and the image-side surface 212 of the first lens element 210 are aspheric.

The second lens element 220 with negative refractive power has a convex object-side surface 221 and a concave image-side surface 222, and is made of plastic material. The object-side surface 221 and the image-side surface 222 of the second lens element 220 are aspheric.

The third lens element 230 with positive refractive power has a concave object-side surface 231 and a convex image-side surface 232, and is made of plastic material. The object-side surface 231 and the image-side surface 232 of the third lens element 230 are aspheric.

The fourth lens element 240 with negative refractive power has a concave object-side ace 241 and a convex image-side surface 242, and is made of plastic material. The object-side surface 241 and the image-side surface 242 of the fourth lens element 240 are aspheric.

The fifth lens element 250 with negative refractive power has a concave object-side surface 251 and a convex image-side surface 252, and is made of plastic material. The object-side surface 251 and the image-side surface 252 of the fifth lens element 250 are aspheric. Furthermore, the image-side 252 of the fifth lens element 250 is convex at the paraxial region and the peripheral region thereof.

The IR-cut filter 270 is made of glass, and located between the fifth lens element 250 and the image plane 260, and will not affect the focal length of the monofocal optical lens system.

The detailed optical data of the 2nd embodiment are shown in Table 3 and the aspheric surface data are shown in Table 4 below.

TABLE 3

2nd Embodiment
f = 3.30 mm, Fno = 2.30, HFOV = 32.4 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.219 | | | | |
| 2 | Lens 1 | 1.218 (ASP) | 0.559 | Plastic | 1.544 | 55.9 | 3.04 |
| 3 | | 3.870 (ASP) | 0.187 | | | | |
| 4 | Lens 2 | 4.239 (ASP) | 0.269 | Plastic | 1.640 | 23.3 | −4.14 |

TABLE 3-continued

2nd Embodiment
f = 3.30 mm, Fno = 2.30, HFOV = 32.4 deg.

| Surface # | | Curvature Radius | Thickness | Material | Index | Abbe # | Focal length |
|---|---|---|---|---|---|---|---|
| 5 | | 1.590 (ASP) | 0.174 | | | | |
| 6 | Lens 3 | −9.101 (ASP) | 0.420 | Plastic | 1.544 | 55.9 | 1.58 |
| 7 | | −0.797 (ASP) | 0.133 | | | | |
| 8 | Lens 4 | −0.759 (ASP) | 0.353 | Plastic | 1.640 | 23.3 | −19.49 |
| 9 | | −0.955 (ASP) | 0.502 | | | | |
| 10 | Lens 5 | −1.178 (ASP) | 0.468 | Plastic | 1.544 | 55.9 | −2.20 |
| 11 | | −100.000 (ASP) | 0.400 | | | | |
| 12 | IR-cut filter | Plano | 0.200 | Glass | 1.517 | 64.2 | — |
| 13 | | Plano | 0.250 | | | | |
| 14 | Image | Plano | — | | | | |

Note:
Reference wavelength (d-line) is 587.6 nm.

TABLE 4

Aspheric Coefficients

| | \| | Surface # | | | |
|---|---|---|---|---|---|
| | 2 | 3 | 4 | 5 | 6 |
| k = | 2.0456E−01 | 8.8866E−01 | −1.9948E+01 | −7.5820E−01 | −1.0000E+00 |
| A4 = | −1.5460E−02 | −1.3040E−01 | −6.3829E−01 | −4.1400E−01 | 1.3033E−03 |
| A6 = | 1.6494E−01 | 2.0901E−03 | 3.5671E−01 | 4.0183E−01 | 4.1810E−01 |
| A8 = | −5.1284E−01 | 1.0798E−01 | −1.1975E+00 | −4.0609E−01 | −4.9192E−02 |
| A10 = | 8.9001E−01 | −8.3332E−01 | 1.0998E+00 | −2.6519E−01 | −4.3002E−01 |
| A12 = | −4.8148E−01 | 4.1093E−01 | 4.5299E−01 | 9.4071E−01 | −1.1977E+00 |
| A14 = | −2.5526E−01 | −5.8443E−01 | −1.2299E+00 | −1.2521E−01 | 3.4584E+00 |
| A16 = | | | | | −2.1947E+00 |

| | | Surface # | | | |
|---|---|---|---|---|---|
| | 7 | 8 | 9 | 10 | 11 |
| k = | −6.2686E−01 | −2.1066E+00 | −1.0504E+00 | −4.2417E+00 | −1.0000E+00 |
| A4 = | 6.8617E−01 | 7.6756E−01 | 3.7480E−01 | −1.0517E−01 | −3.9781E−02 |
| A6 = | −1.5572E−01 | −8.1910E−01 | −2.0783E−01 | 1.0374E−01 | 2.3138E−02 |
| A8 = | 1.6489E−01 | 8.5422E−01 | 1.7345E−01 | −1.1506E−01 | −2.9215E−02 |
| A10 = | 3.0607E−01 | −6.5787E−01 | 4.4552E−02 | 5.6340E−02 | 1.3378E−02 |
| A12 = | −3.9631E−01 | 1.3837E−01 | −8.1843E−02 | 2.9598E−02 | −1.6316E−03 |
| A14 = | 1.3441E−01 | 1.8414E−01 | −4.4125E−02 | −2.9806E−02 | −5.7348E−04 |
| A16 = | −9.6026E−02 | −1.2052E−01 | 3.3285E−02 | 6.1182E−03 | 1.5341E−04 |

In the monofocal optical lens system according to the 2nd embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 2nd embodiment. Moreover, these parameters can be calculated from Table 3 and Table 4 as the following values and satisfy the following relationships:

| | | | |
|---|---|---|---|
| f (mm) | 3.30 | TD (mm) | 3.07 |
| Fno | 2.30 | (R5 + R6)/(R5 − R6) | 1.19 |
| HFOV (deg.) | 32.4 | R9/R10 | 0.01 |
| V1/V2 | 2.40 | f5/f4 | 0.11 |
| ΣCT/TD | 0.68 | TTL/ImgH | 1.79 |
| Dr1s/Dr1r4 | 0.22 | | |

3rd Embodiment

Figure 5:
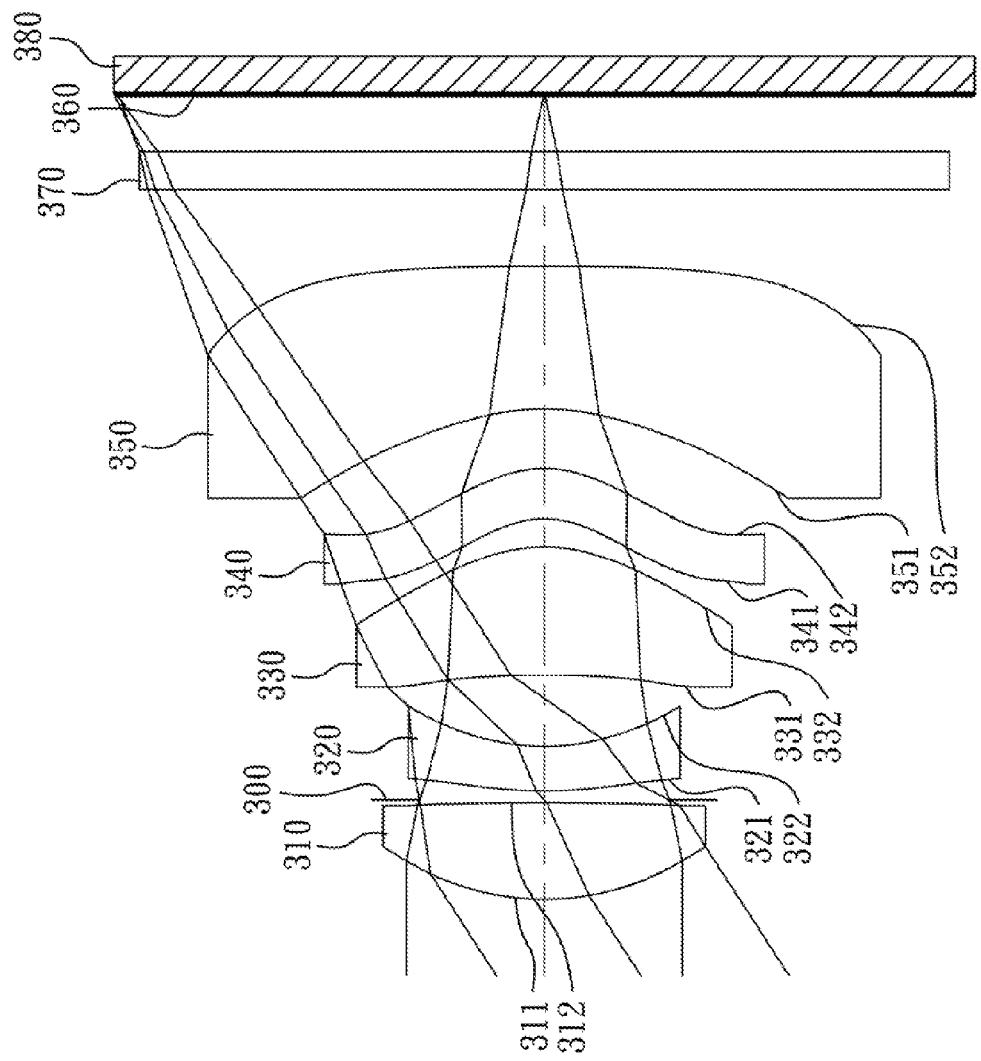
FIG. 5 is a schematic view of a monofocal optical lens system according to the 3rd embodiment of the present disclosure.
Figure 6:
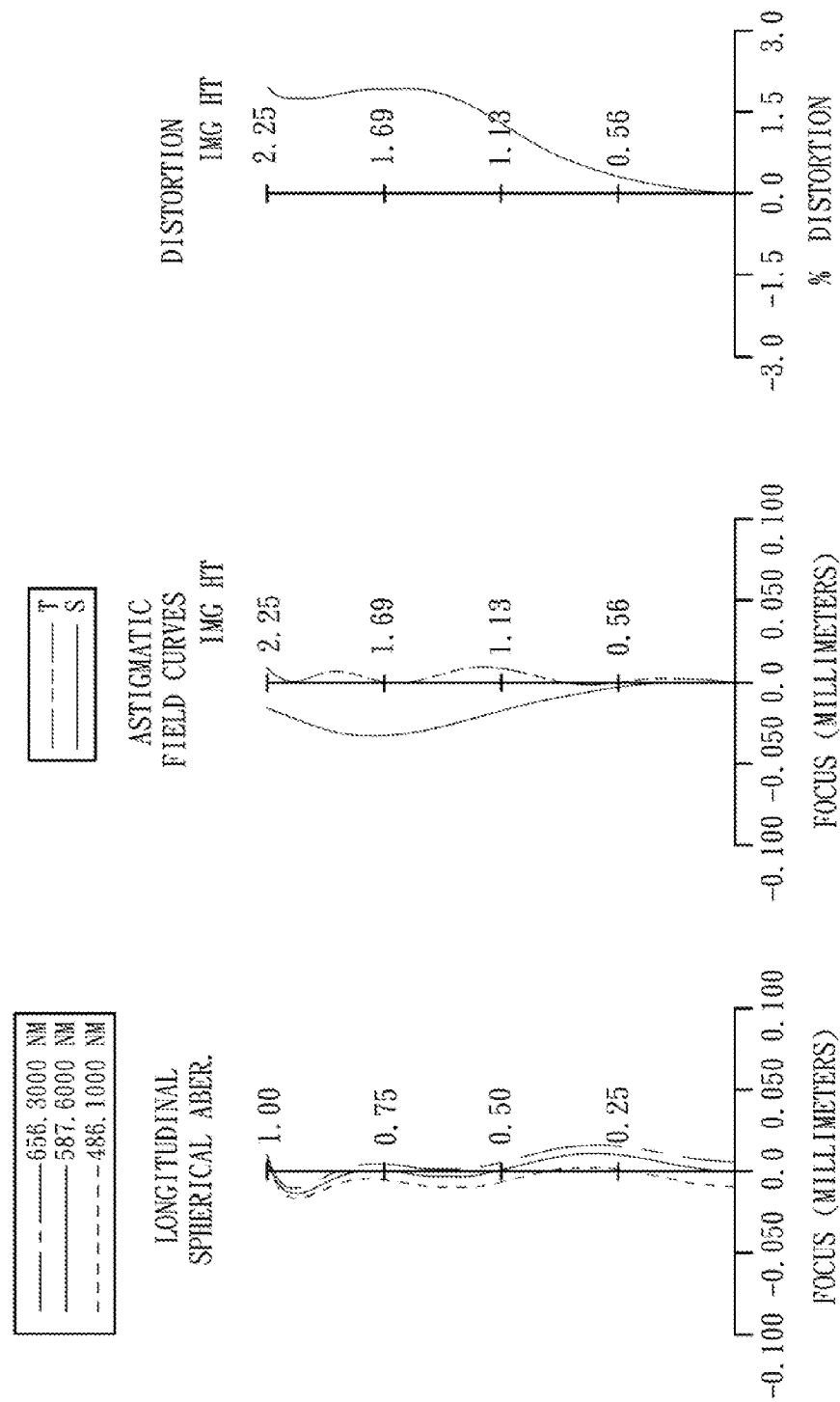
FIG. 6 shows spherical aberration curves, astigmatic field curves and a distortion curve of the monofocal optical lens system according to the 3rd embodiment.

FIG. 5 is a schematic view of a monofocal optical lens system according to the 3rd embodiment of the present disclosure. FIG. 6 shows spherical aberration curves, astigmatic field curves and a distortion curve of the monofocal optical lens system according to the 3rd embodiment. In FIG. 5, the monofocal optical lens system includes, in order from an object side to an image side, the first lens element 310, an aperture stop 300, the second lens element 320, the third lens element 330, the fourth lens element 340, the fifth lens element 350, an IR-cut filter 370, an image plane 360 and an image sensor 380.

The first lens element 310 with positive refractive power has a convex object-side surface 311 and a convex image-side surface 312, and is made of plastic material. The object-side surface 311 and the image-side surface 312 of the first lens element 310 are aspheric.

The second lens element 320 with negative refractive power has a convex object-side surface 321 and a concave image-side surface 322, and is made of plastic material. The object-side surface 321 and the image-side surface 322 of the second lens element 320 are aspheric.

The third lens element 330 with positive refractive power has a concave object-side surface 331 and a convex image-side surface 332, and is made of plastic material. The object-side surface 331 and the image-side surface 332 of the third lens element 330 are aspheric.

The fourth lens element 340 with negative refractive power has a concave object-side surface 341 and a convex image-side surface 342, and is made of plastic material. The object-side surface 341 and the image-side surface 342 of the fourth lens element 340 are aspheric.

The fifth lens element 350 with negative refractive power has a concave object-side surface 351 and a convex image-side surface 352, and is made of plastic material. The object-side surface 351 and the image-side surface 352 of the fifth lens element 350 are aspheric. Furthermore, the image-side 352 of the fifth lens element 350 is convex at the paraxial region and the peripheral region thereof.

The IR-cut filter 370 is made of glass, and located between the fifth lens element 350 and the image plane 360, and will not affect the focal length of the monofocal optical lens system.

The detailed optical data of the 3rd embodiment are shown in Table 5 and the aspheric surface data are shown in Table 6 below.

In the monofocal optical lens system according to the 3rd embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 3rd embodiment. Moreover, these parameters can be calculated from Table 5 and Table 6 as the following values and satisfy the following relationships:

| f (mm) | 3.39 | TD (mm) | 3.31 |
| Fno | 2.35 | (R5 + R6)/(R5 − R6) | 1.30 |
| HFOV (deg.) | 33.1 | R9/R10 | 0.05 |
| V1/V2 | 2.35 | f5/f4 | 0.03 |
| ΣCT/TD | 0.73 | TTL/ImgH | 1.84 |
| Dr1s/Dr1r4 | 0.65 | | |

TABLE 5

3rd Embodiment
f = 3.39 mm, Fno = 2.35, HFOV = 33.1 deg.

| Surface # | | Curvature Radius | Thickness | Material | Index | Abbe # | Focal length |
|---|---|---|---|---|---|---|---|
| 0 | Object | Plano | Infinity | | | | |
| 1 | Lens 1 | 1.409 (ASP) | 0.504 | Plastic | 1.544 | 55.9 | 2.46 |
| 2 | | −23.910 (ASP) | 0.015 | | | | |
| 3 | Ape. Stop | Plano | 0.050 | | | | |
| 4 | Lens 2 | 2.237 (ASP) | 0.230 | Plastic | 1.634 | 23.8 | −3.98 |
| 5 | | 1.138 (ASP) | 0.374 | | | | |
| 6 | Lens 3 | −6.123 (ASP) | 0.673 | Plastic | 1.544 | 55.9 | 1.64 |
| 7 | | −0.809 (ASP) | 0.147 | | | | |
| 8 | Lens 4 | −0.491 (ASP) | 0.260 | Plastic | 1.634 | 23.8 | −90.60 |
| 9 | | −0.597 (ASP) | 0.315 | | | | |
| 10 | Lens 5 | −1.183 (ASP) | 0.744 | Plastic | 1.544 | 55.9 | −2.31 |
| 11 | | −24.271 (ASP) | 0.400 | | | | |
| 12 | IR-cut filter | Plano | 0.200 | Glass | 1.517 | 64.2 | — |
| 13 | | Plano | 0.299 | | | | |
| 14 | Image | Plano | — | | | | |

Note:
Reference wavelength (d-line) is 587.6 nm.

TABLE 6

Aspheric Coefficients

| | Surface # | | | | |
|---|---|---|---|---|---|
| | 1 | 2 | 4 | 5 | 6 |
| k = | 1.6533E−01 | −1.0000E+00 | 1.0044E+00 | −6.1182E−01 | −1.0000E+00 |
| A4 = | −1.6225E−02 | −5.0857E−02 | −3.2361E−01 | −2.3450E−01 | −9.1792E−02 |
| A6 = | 1.5377E−01 | 2.6527E−01 | 7.2004E−01 | 5.6191E−01 | −9.6092E−02 |
| A8 = | −6.0396E−01 | −3.2586E−01 | −1.5086E+00 | −7.6391E−01 | 3.1323E−01 |
| A10 = | 1.1094E+00 | −4.7875E−01 | 1.1561E+00 | 2.9298E−01 | −1.4024E−02 |
| A12 = | −8.4494E−01 | 8.5272E−01 | 5.9571E−01 | 1.6097E+00 | −9.8942E−01 |
| A14 = | 3.6392E−02 | −2.9772E−01 | −1.6794E+00 | −2.2188E+00 | 3.2470E+00 |
| A16 = | | | | | −2.5869E+00 |

| | Surface # | | | | |
|---|---|---|---|---|---|
| | 7 | 8 | 9 | 10 | 11 |
| k = | −4.2052E−01 | −1.7326E+00 | −1.8043E+00 | −7.9823E+00 | −1.0000E+00 |
| A4 = | 5.0616E−01 | 6.3783E−01 | 3.5682E−01 | −1.0638E−01 | −3.8615E−02 |
| A6 = | −1.8791E−01 | −6.7234E−01 | −2.6855E−01 | 1.0374E−01 | 3.3452E−02 |
| A8 = | 2.0679E−02 | 8.8279E−01 | 1.9884E−01 | −1.0587E−01 | −3.1920E−02 |
| A10 = | 3.0249E−01 | −6.9813E−01 | 5.5897E−02 | 4.8334E−02 | 1.1717E−02 |
| A12 = | −3.3886E−01 | 1.1243E−01 | −7.7366E−02 | 2.2787E−02 | −1.2611E−03 |
| A14 = | 2.0068E−01 | 1.6183E−01 | −4.4452E−02 | −3.1527E−02 | −3.0822E−04 |
| A16 = | −1.1482E−02 | −8.1035E−02 | 3.0976E−02 | 8.6619E−03 | 6.2320E−05 |

4th Embodiment

Figure 7:
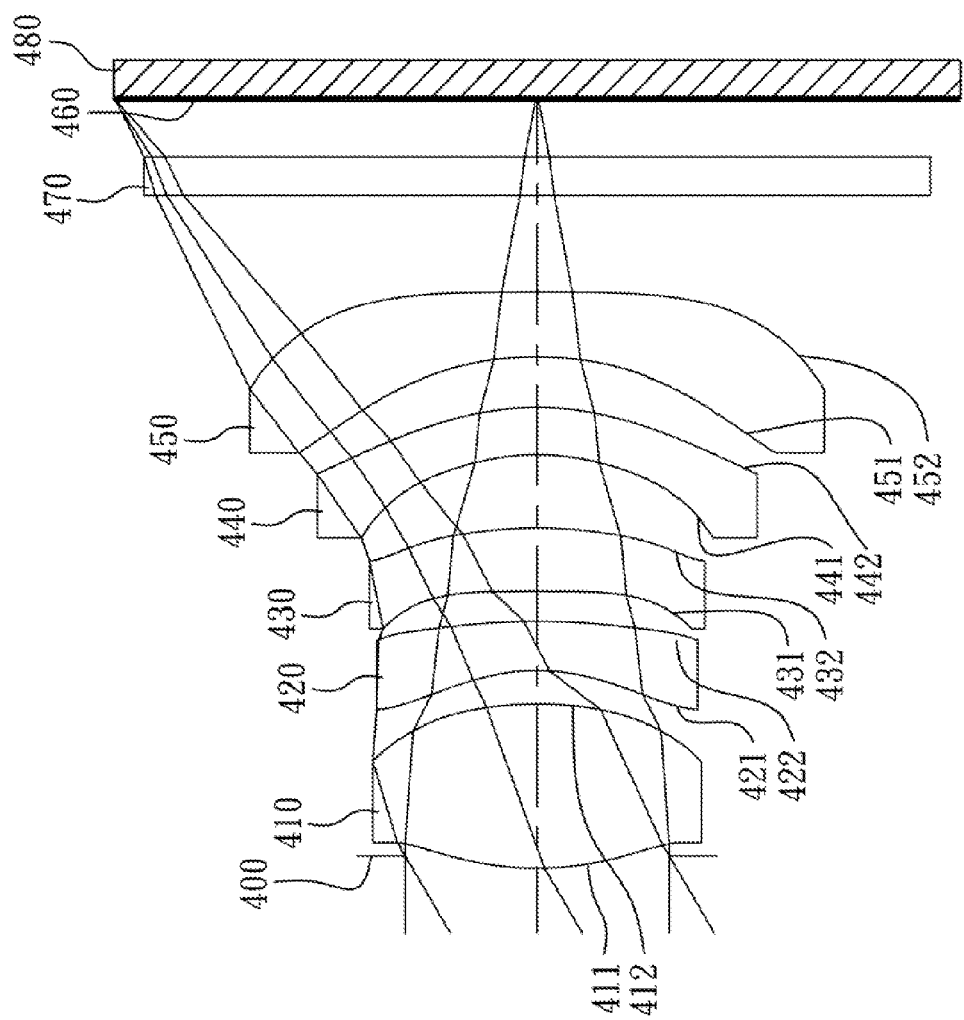
FIG. 7 is a schematic view of a monofocal optical lens system according to the 4th embodiment of the present disclosure.
Figure 8:
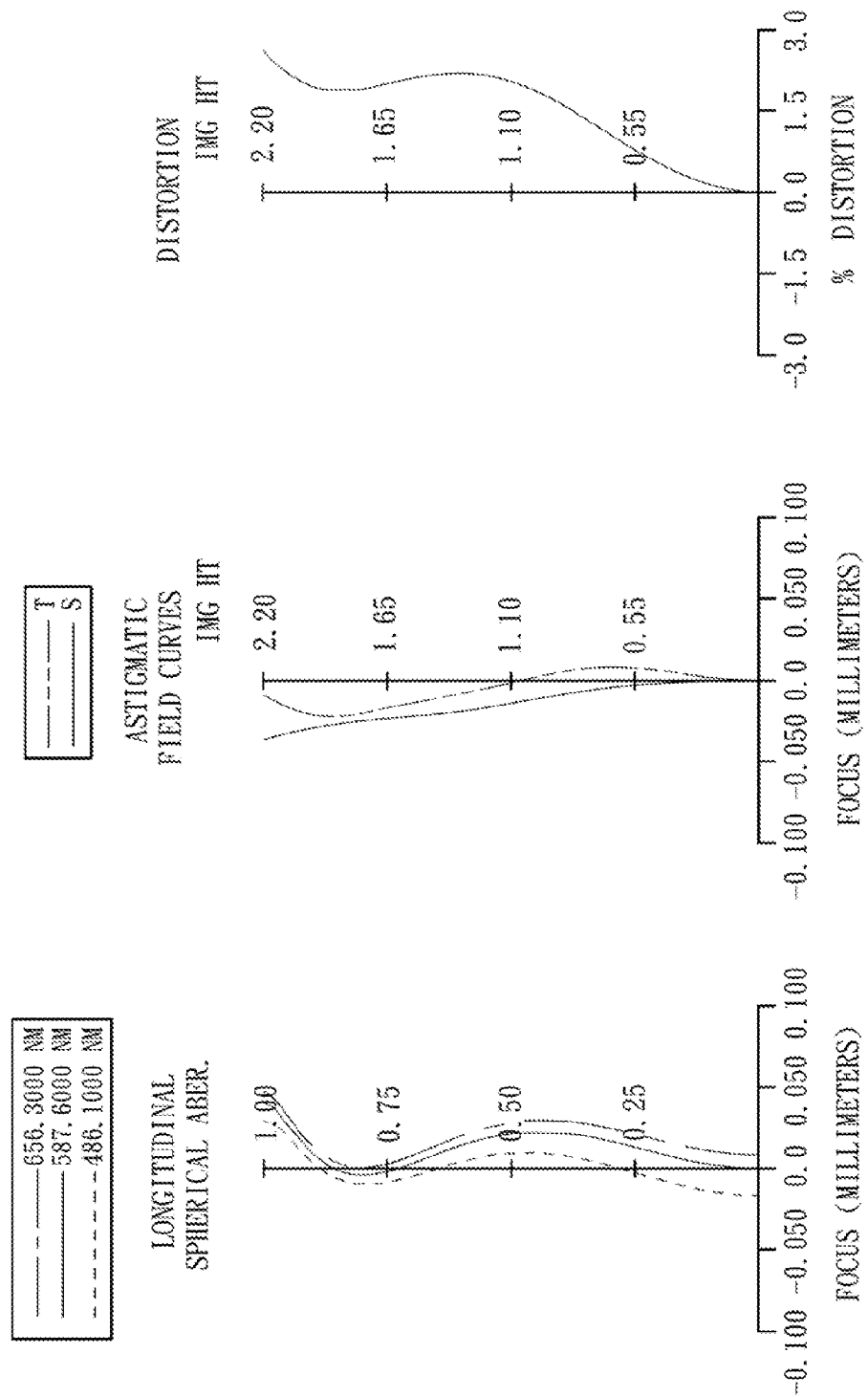
FIG. 8 shows spherical aberration curves, astigmatic field curves and a distortion curve of the monofocal optical lens system according to the 4th embodiment.

FIG. 7 is a schematic view of a monofocal optical lens system according to the 4th embodiment of the present disclosure. FIG. 8 shows spherical aberration curves, astigmatic field curves and a distortion curve of the monofocal optical lens system according to the 4th embodiment. In FIG. 7, the monofocal optical lens system includes, in order from an object side to an image side, an aperture stop 400, the first lens element 410, the second lens element 420, the third lens element 430, the fourth lens element 440, the fifth lens element 450, an IR-cut filter 470, an image plane 460 and an image sensor 480.

The first lens element 410 with positive refractive power has a convex object-side surface 411 and a convex image-side surface 412, and is made of plastic material. The object-side surface 411 and the image-side surface 412 of the first lens element 410 are aspheric.

The second lens element 420 with negative refractive power has a concave object-side surface 421 and a convex image-side surface 422, and is made of plastic material. The object-side surface 421 and the image-side surface 422 of the second lens element 420 are aspheric.

The third lens element 430 with positive refractive power has a concave object-side surface 431 and a convex image-side surface 432, and is made of plastic material. The object-side surface 431 and the image-side surface 432 of the third lens element 430 are aspheric.

The fourth lens element 440 with negative refractive power has a concave object-side surface 441 and a convex image-side surface 442, and is made of plastic material. The object-side surface 441 and the image-side surface 442 of the fourth lens element 440 are aspheric.

The fifth lens element 450 with negative refractive power has a concave object-side surface 451 and a convex image-side surface 452, and is made of plastic material. The object-side surface 451 and the image-side surface 452 of the fifth lens element 450 are aspheric. Furthermore, the image-side 452 of the fifth lens element 450 is convex at the paraxial region and the peripheral region thereof.

The IR-cut filter 470 is made of glass, and located between the fifth lens element 450 and the image plane 460, and will not affect the focal length of the monofocal optical lens system.

The detailed optical data of the 4th embodiment are shown in Table 7 and the aspheric surface data are shown in Table 8 below

TABLE 7

4th Embodiment
f = 3.64 mm, Fno = 2.65, HFOV = 30.5 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.065 | | | | |
| 2 | Lens 1 | 1.550 (ASP) | 0.854 | Plastic | 1.544 | 55.9 | 1.76 |
| 3 | | −2.030 (ASP) | 0.174 | | | | |
| 4 | Lens 2 | −1.062 (ASP) | 0.259 | Plastic | 1.640 | 23.3 | −2.43 |
| 5 | | −3.675 (ASP) | 0.154 | | | | |
| 6 | Lens 3 | −13.676 (ASP) | 0.332 | Plastic | 1.640 | 23.3 | 3.98 |
| 7 | | −2.169 (ASP) | 0.378 | | | | |
| 8 | Lens 4 | −1.206 (ASP) | 0.250 | Plastic | 1.535 | 56.3 | −30.25 |
| 9 | | −1.397 (ASP) | 0.259 | | | | |
| 10 | Lens 5 | −1.752 (ASP) | 0.340 | Plastic | 1.535 | 56.3 | −3.51 |
| 11 | | −28.571 (ASP) | 0.500 | | | | |
| 12 | IR-cut filter | Plano | 0.200 | Glass | 1.517 | 64.2 | — |
| 13 | | Plano | 0.305 | | | | |
| 14 | Image | Plano | — | | | | |

Note:
Reference wavelength (d-line) is 587.6 nm.

TABLE 8

Aspheric Coefficients

| Surface # | | | | |
|---|---|---|---|---|
| 2 | 3 | 4 | 5 | 6 |

| | | | | |
|---|---|---|---|---|
| k = −3.1166E−02 | −1.0000E+00 | −2.2669E+00 | −1.2908E+00 | −1.0000E+00 |
| A4 = −7.3068E−02 | −1.9911E−01 | −2.7406E−02 | −2.3564E−02 | −2.3580E−01 |
| A6 = −1.0074E−02 | −1.2659E−01 | 3.8154E−01 | 2.3951E−01 | −2.5372E−01 |
| A8 = −2.7480E−01 | 5.2541E−01 | −1.4008E−01 | −2.4718E−01 | −1.9222E−01 |
| A10 = 1.8028E−01 | −7.2262E−01 | −1.8107E−01 | −2.2282E−02 | 3.0065E−01 |
| A12 = −4.6832E−01 | 2.5558E−01 | 2.1916E−01 | −1.2738E−01 | −1.3658E−01 |
| A14 = | | | | 7.6515E−02 |
| A16 = | | | | 1.6716E−02 |

| Surface # | | | | |
|---|---|---|---|---|
| 7 | 8 | 9 | 10 | 11 |

| | | | | |
|---|---|---|---|---|
| k = −1.1791E+01 | −1.0254E+00 | −5.9038E−01 | −5.1040E−01 | −1.0000E+00 |
| A4 = −2.5103E−02 | 1.7840E−01 | 1.2544E−01 | −8.2274E−02 | −7.2499E−02 |
| A6 = −2.2861E−01 | −3.3462E−01 | −3.2874E−02 | 4.4844E−02 | −1.1838E−02 |

TABLE 8-continued

| Aspheric Coefficients | | | | |
|---|---|---|---|---|
| A8 = | −1.9899E−02 | 6.2401E−02 | 1.3232E−03 | −2.4818E−03 | 7.0625E−03 |
| A10 = | 5.2153E−02 | −1.4431E−01 | −4.1196E−03 | −5.5504E−04 | −3.8816E−03 |
| A12 = | 3.4492E−01 | 2.9557E−02 | 5.0169E−03 | 1.4043E−03 | 5.1534E−04 |

In the monofocal optical lens system according to the 4th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 4th embodiment. Moreover, these parameters can be calculated from Table 7 and Table 8 as the following values and satisfy the following relationships:

| f (mm) | 3.64 | TD (mm) | 3.00 |
|---|---|---|---|
| Fno | 2.65 | (R5 + R6)/(R5 − R6) | 1.38 |
| HFOV (deg.) | 30.5 | R9/R10 | 0.06 |
| V1/V2 | 2.40 | f5/f4 | 0.12 |
| ΣCT/TD | 0.68 | TTL/ImgH | 1.79 |
| Dr1s/Dr1r4 | 0.05 | | |

5th Embodiment

Figure 9:
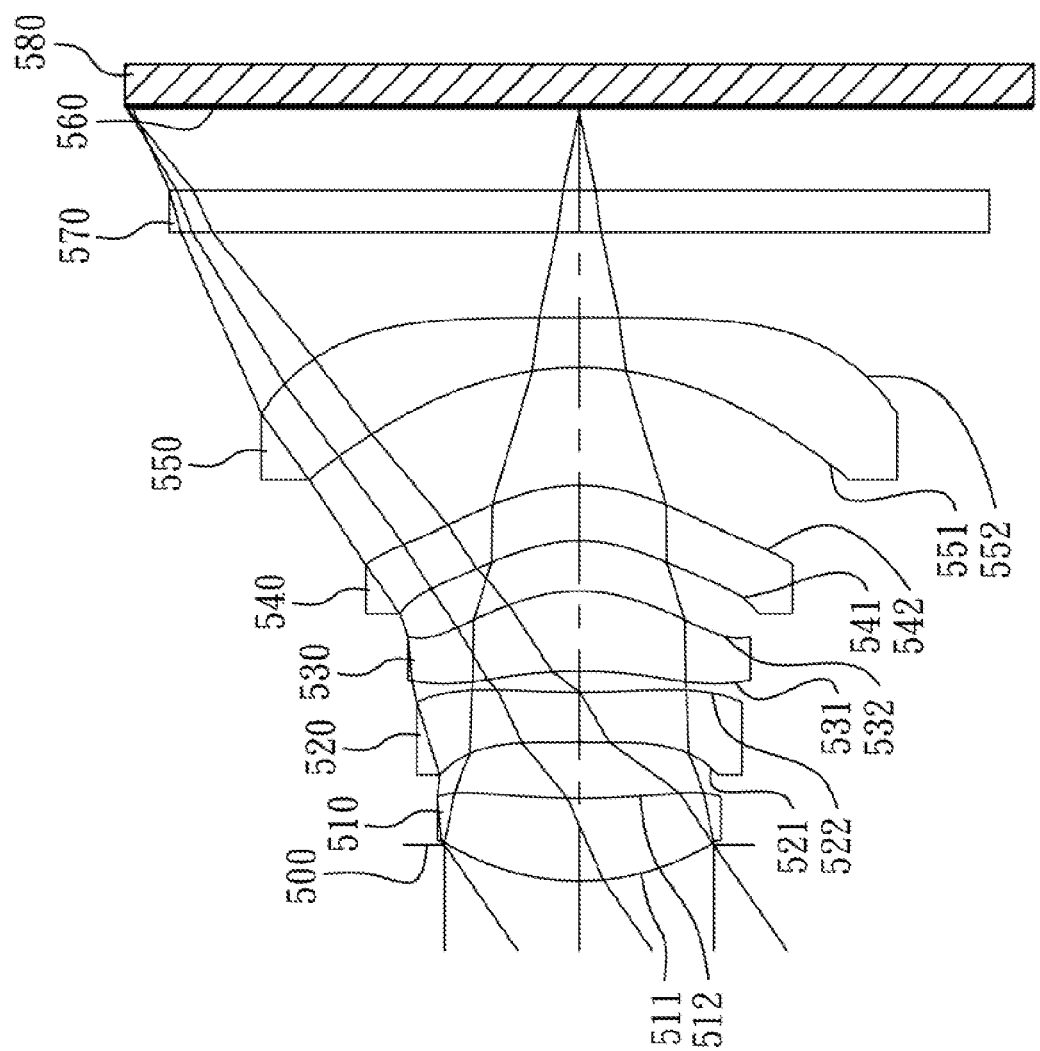
FIG. 9 is a schematic view of a monofocal optical lens system according to the 5th embodiment of the present disclosure.
Figure 10:
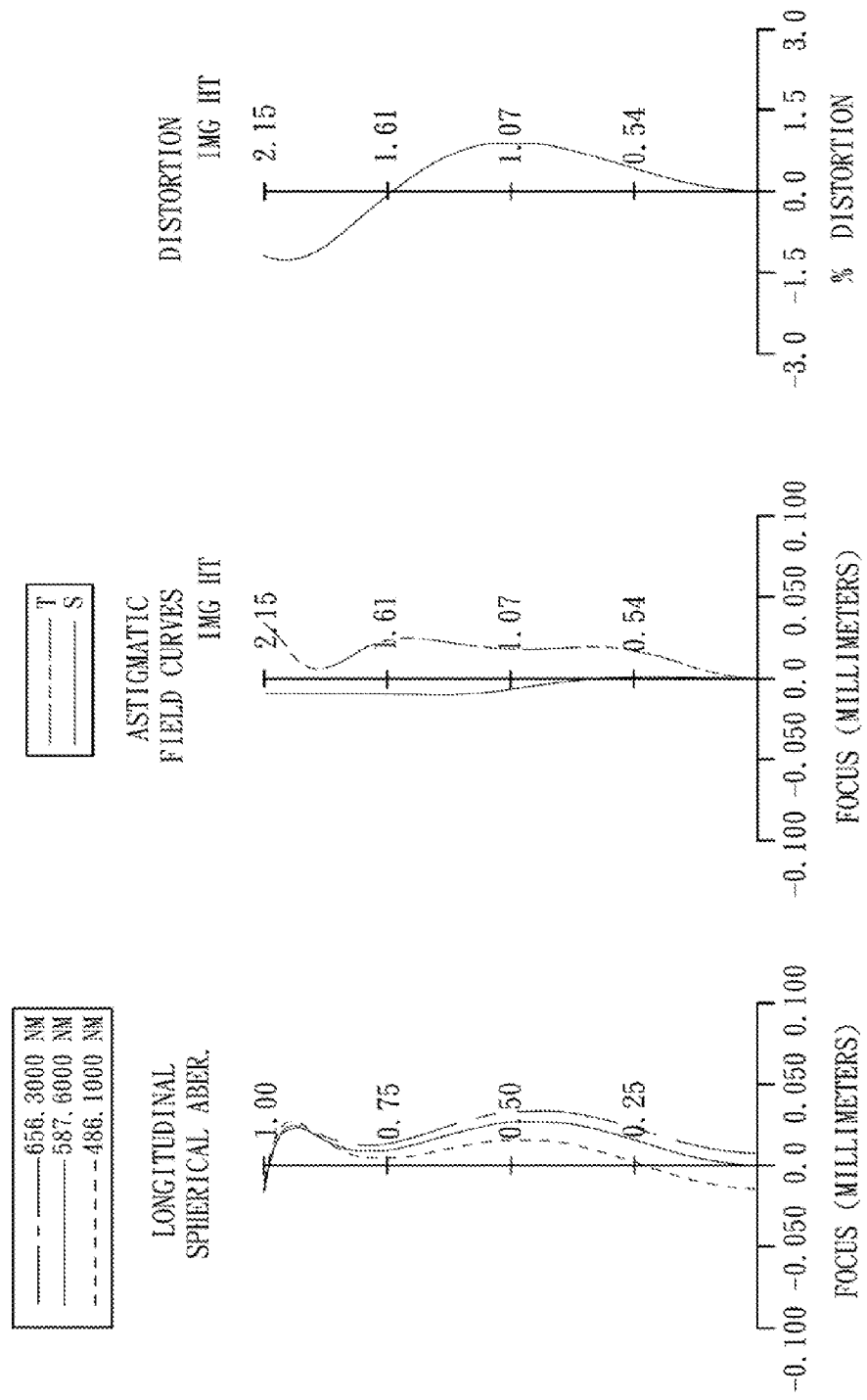
FIG. 10 shows spherical aberration curves, astigmatic field curves and a distortion curve of the monofocal optical lens system according to the 5th embodiment.

FIG. 9 is a schematic view of a monofocal optical lens system according to the 5th embodiment of the present disclosure. FIG. 10 shows spherical aberration curves, astigmatic field curves and a distortion curve of the monofocal optical lens system according to the 5th embodiment. In FIG. 9, the monofocal optical lens system includes, in order from an object side to an image side, an aperture stop 500, the first lens element 510, the second lens element 520, the third lens element 530, the fourth lens element 540, the fifth lens element 550, an IR-cut filter 570, an image plane 560 and an image sensor 580.

The first lens element 510 with positive refractive power has a convex object-side surface 511 and a concave image-side surface 512, and is made of glass material. The object-side surface 511 and the image-side surface 512 of the first lens element 510 are aspheric.

The second lens element 520 with negative refractive power has a concave object-side surface 521 and a concave image-side surface 522, and is made of plastic material. The object-side surface 521 and the image-side surface 522 of the second lens element 520 are aspheric.

The third lens element 530 with positive refractive power has a concave object-side surface 531 and a convex image-side surface 532, and is made of plastic material. The object-side surface 531 and the image-side surface 532 of the third lens element 530 are aspheric.

The fourth lens element 540 with negative refractive power has a concave object-side surface 541 and a convex image-side surface 542, and is made of plastic material. The object-side surface 541 and the image-side surface 542 of the fourth lens element 540 are aspheric.

The fifth lens element 550 with negative refractive power has a concave object-side surface 551 and a convex image-side surface 552, and is made of plastic material. The object-side surface 551 and the image-side surface 552 of the fifth lens element 550 are aspheric. Furthermore, the image-side 552 of the fifth lens element 550 is convex at the paraxial region and the peripheral region thereof.

The IR-cut filter 570 is made of glass, and located between the fifth lens element 550 and the image plane 560, and will not affect the focal length of the monofocal optical lens system.

The detailed optical data of the 5th embodiment are shown in Table 9 and the aspheric surface data are shown in Table 10 below.

TABLE 9

5th Embodiment
f = 3.13 mm, Fno = 2.45, HFOV = 34.7 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.170 | | | | |
| 2 | Lens 1 | 1.203 (ASP) | 0.395 | Glass | 1.569 | 71.3 | 2.95 |
| 3 | | 3.740 (ASP) | 0.263 | | | | |
| 4 | Lens 2 | −100.000 (ASP) | 0.240 | Plastic | 1.607 | 26.6 | −5.96 |
| 5 | | 3.760 (ASP) | 0.100 | | | | |
| 6 | Lens 3 | −2.104 (ASP) | 0.377 | Plastic | 1.535 | 56.3 | 2.16 |
| 7 | | −0.792 (ASP) | 0.242 | | | | |
| 8 | Lens 4 | −0.703 (ASP) | 0.260 | Plastic | 1.607 | 26.6 | −61.17 |
| 9 | | −0.817 (ASP) | 0.558 | | | | |
| 10 | Lens 5 | −1.461 (ASP) | 0.240 | Plastic | 1.535 | 56.3 | −2.85 |
| 11 | | −39.370 (ASP) | 0.400 | | | | |
| 12 | IR-cut filter | Plano | 0.200 | Glass | 1.517 | 64.2 | — |
| 13 | | Plano | 0.401 | | | | |
| 14 | Image | Plano | — | | | | |

Note:
Reference wavelength (d-line) is 587.6 nm.

TABLE 10

Aspheric Coefficients

| Surface # | 2 | 3 | 4 | 5 | 6 |
|---|---|---|---|---|---|
| k = | 3.2607E−01 | −2.1375E+01 | −1.0000E+00 | 0.0000E+00 | −8.8005E+00 |
| A4 = | −1.8375E−02 | −2.9167E−02 | −6.7811E−01 | −3.9572E−01 | −4.7257E−02 |
| A6 = | 2.5460E−02 | −2.9084E−01 | 2.5090E−01 | 1.1093E−01 | 4.2659E−01 |
| A8 = | −1.9242E−01 | 5.1796E−01 | −2.1701E+00 | −1.2763E−01 | 3.9344E−01 |
| A10 = | 5.6216E−01 | −1.5350E+00 | 2.8311E+00 | 2.0315E−01 | −5.1842E−01 |
| A12 = | −8.7110E−01 | −2.4386E−01 | −1.0080E+00 | −1.7787E−01 | −1.4040E+00 |
| A14 = | −1.1014E+00 | −1.1547E+00 | −1.3580E+00 | −1.0607E−01 | 2.9225E+00 |
| A16 = | | | | | −1.9482E+00 |

| Surface # | 7 | 8 | 9 | 10 | 11 |
|---|---|---|---|---|---|
| k = | −4.0489E−01 | −1.8455E+00 | −1.1259E+00 | −6.2483E+00 | −1.0000E+00 |
| A4 = | 4.5710E−01 | 4.2589E−01 | 3.2238E−01 | −1.3020E−01 | −4.5604E−02 |
| A6 = | 3.1558E−02 | −3.4861E−01 | −1.3467E−01 | 1.0374E−01 | −1.9916E−02 |
| A8 = | 3.6293E−01 | 3.1795E−01 | 1.7744E−01 | −1.3507E−01 | −4.3357E−03 |
| A10 = | 3.8193E−01 | −7.3914E−01 | 2.2741E−02 | 9.2831E−02 | 7.6969E−03 |
| A12 = | −5.2963E−01 | 7.7931E−01 | −1.9066E−01 | 4.5826E−03 | −1.9565E−03 |
| A14 = | 3.0662E−01 | −4.2524E−01 | −1.2328E−01 | −3.0896E−02 | −5.5904E−04 |
| A16 = | 1.5390E−01 | −4.9214E−01 | 1.4494E−01 | 9.1490E−03 | 1.8818E−04 |

In the monofocal optical lens system according to the 5th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 5th embodiment. Moreover, these parameters can be calculated from Table 9 and Table 10 as the following values and satisfy the following relationships:

| f (mm) | 3.13 | TD (mm) | 2.68 |
|---|---|---|---|
| Fno | 2.45 | (R5 + R6)/(R5 − R6) | 2.21 |
| HFOV (deg.) | 34.7 | R9/R10 | 0.04 |
| V1/V2 | 2.68 | f5/f4 | 0.05 |
| ΣCT/TD | 0.57 | TTL/ImgH | 1.68 |
| Dr1s/Dr1r4 | 0.19 | | |

6th Embodiment

Figure 11:
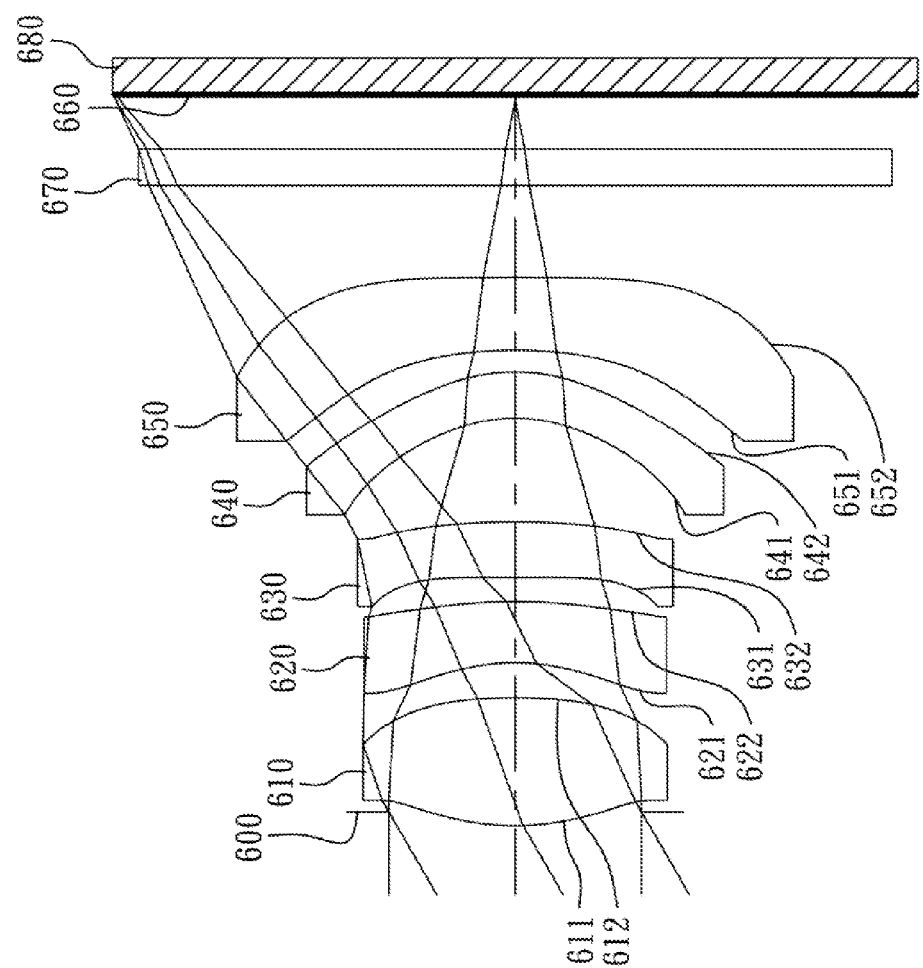
FIG. 11 is a schematic view of a monofocal optical lens system according to the 6th embodiment of the present disclosure.
Figure 12:
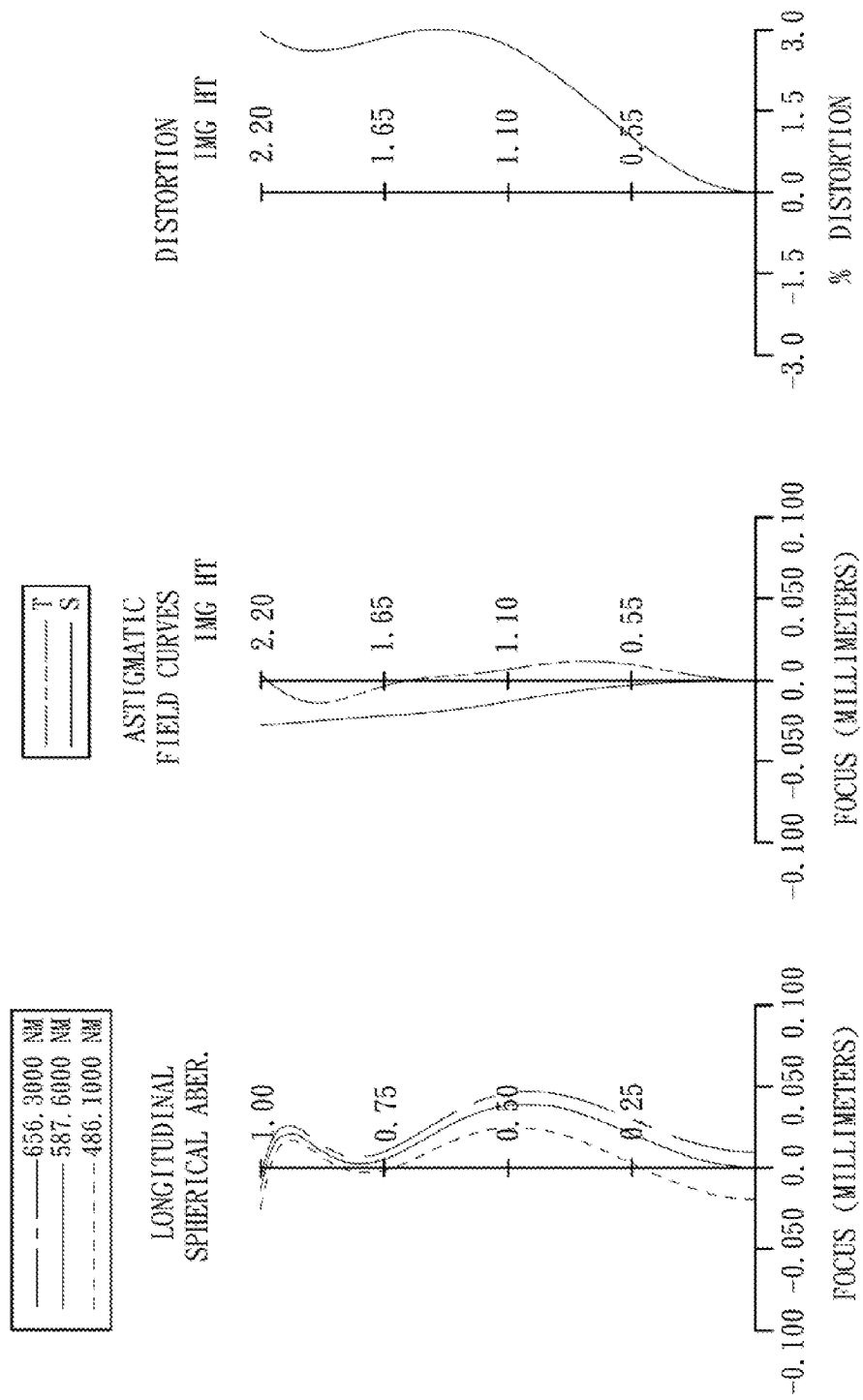
FIG. 12 shows spherical aberration curves, astigmatic field curves and a distortion curve of the monofocal optical lens system according to the 6th embodiment.

FIG. 11 is a schematic view of a monofocal optical lens system according to the 6th embodiment of the present disclosure. FIG. 12 shows spherical aberration curves, astigmatic field curves and a distortion curve of the monofocal optical lens system according to the 6th embodiment. In FIG. 11, the monofocal optical lens system includes, in order from an object side to an image side, an aperture stop 600, the first lens element 610, the second lens element 620, the third lens element 630, the fourth lens element 640, the fifth lens element 650, an IR-cut filter 670, an image plane 660 and an image sensor 680.

The first lens element 610 with positive refractive power has a convex object-side surface 611 and a convex image-side surface 612, and is made of plastic material. The object-side surface 611 and the image-side surface 612 of the first lens element 610 are aspheric.

The second lens element 620 with negative refractive power has a concave object-side surface 621 and a convex image-side surface 622, and is made of plastic material. The object-side surface 621 and the image-side surface 622 of the second lens element 620 are aspheric.

The third lens element 630 with positive refractive power has a convex object-side surface 631 and a convex image-side surface 632, and is made of plastic material. The object-side surface 631 and the image-side surface 632 of the third lens element 630 are aspheric.

The fourth lens element 640 with negative refractive power has a concave object-side surface 641 and a convex image-side surface 642, and is made of plastic material. The object-side surface 641 and the image-side surface 642 of the fourth lens element 640 are aspheric.

The fifth lens element 650 with negative refractive power has a concave object-side surface 651 and a convex image-side surface 652, and is made of plastic material. The object-side surface 651 and the image-side surface 652 of the fifth lens element 650 are aspheric. Furthermore, the image-side 652 of the fifth lens element 650 is convex at the paraxial region and the peripheral region thereof.

The IR-cut filter 670 is made of glass, and located between the fifth lens element 650 and the image plane 660, and will not affect the focal length of the monofocal optical lens system.

The detailed optical data of the 6th embodiment are shown in Table 11 and the aspheric surface data are shown in Table 12 below.

TABLE 11

6th Embodiment
f = 3.66 mm, Fno = 2.65, HFOV = 30.2 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.074 | | | | |
| 2 | Lens 1 | 1.434 (ASP) | 0.700 | Plastic | 1.544 | 55.9 | 1.87 |
| 3 | | −2.899 (ASP) | 0.191 | | | | |
| 4 | Lens 2 | −1.168 (ASP) | 0.336 | Plastic | 1.640 | 23.3 | −3.08 |
| 5 | | −3.199 (ASP) | 0.130 | | | | |
| 6 | Lens 3 | 30.832 (ASP) | 0.307 | Plastic | 1.640 | 23.3 | 5.40 |
| 7 | | −3.879 (ASP) | 0.567 | | | | |
| 8 | Lens 4 | −0.848 (ASP) | 0.250 | Plastic | 1.535 | 56.3 | −19.69 |
| 9 | | −1.017 (ASP) | 0.119 | | | | |
| 10 | Lens 5 | −2.598 (ASP) | 0.401 | Plastic | 1.535 | 56.3 | −5.04 |
| 11 | | −76.923 (ASP) | 0.500 | | | | |
| 12 | IR-cut filter | Plano | 0.200 | Glass | 1.517 | 64.2 | — |
| 13 | | Plano | 0.299 | | | | |
| 14 | Image | Plano | — | | | | |

Note:
Reference wavelength (d-line) is 587.6 nm.

TABLE 12

Aspheric Coefficients

| Surface # | 2 | 3 | 4 | 5 | 6 |
|---|---|---|---|---|---|
| k = | −1.6607E−01 | −1.0000E+00 | −2.5055E+00 | −1.1967E+00 | −1.0000E+00 |
| A4 = | −7.8667E−02 | −2.0498E−01 | −1.5450E−02 | −2.6320E−02 | −2.7136E−01 |
| A6 = | −2.0583E−02 | −2.0681E−01 | 3.5932E−01 | 2.4387E−01 | −2.0256E−01 |
| A8 = | −2.3400E−01 | 5.2579E−01 | −1.5751E−01 | −1.2688E−01 | −2.8335E−01 |
| A10 = | −5.3332E−02 | −7.3948E−01 | −6.5872E−02 | −7.0830E−02 | 3.1464E−01 |
| A12 = | −4.6832E−01 | 2.5558E−01 | 2.1916E−01 | −1.2738E−01 | −1.3658E−01 |
| A14 = | | | | | 7.6515E−02 |
| A16 = | | | | | 1.6716E−02 |

| Surface # | 7 | 8 | 9 | 10 | 11 |
|---|---|---|---|---|---|
| k = | −2.0000E+01 | −1.0492E+00 | −5.9107E−01 | 1.0254E+00 | −1.0000E+00 |
| A4 = | 1.7616E−02 | 1.9364E−01 | 1.5515E−01 | −1.3204E−01 | −7.3365E−02 |
| A6 = | −2.4114E−01 | −1.9546E−01 | −9.1431E−03 | 4.3753E−02 | −1.8557E−01 |
| A8 = | 2.3706E−02 | 1.4029E−02 | 7.3727E−03 | −2.9693E−03 | 1.3225E−02 |
| A10 = | 6.2611E−02 | −1.2600E−01 | −8.4151E−03 | −6.1132E−05 | −5.9566E−03 |
| A12 = | 3.0695E−01 | 2.6382E−02 | 6.5391E−04 | 1.6225E−03 | 6.9961E−04 |

In the monofocal optical lens system according to the 6th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 6th embodiment. Moreover, these parameters can be calculated from Table 11 and Table 12 as the following values and satisfy the following relationships:

| | | | |
|---|---|---|---|
| f (mm) | 3.66 | TD (mm) | 3.00 |
| Fno | 2.65 | (R5 + R6)/(R5 − R6) | 0.78 |
| HFOV (deg.) | 30.2 | R9/R10 | 0.03 |
| V1/V2 | 2.40 | f5/f4 | 0.26 |
| ΣCT/TD | 0.66 | TTL/ImgH | 1.79 |
| Dr1s/Dr1r4 | 0.06 | | |

7th Embodiment

Figure 13:
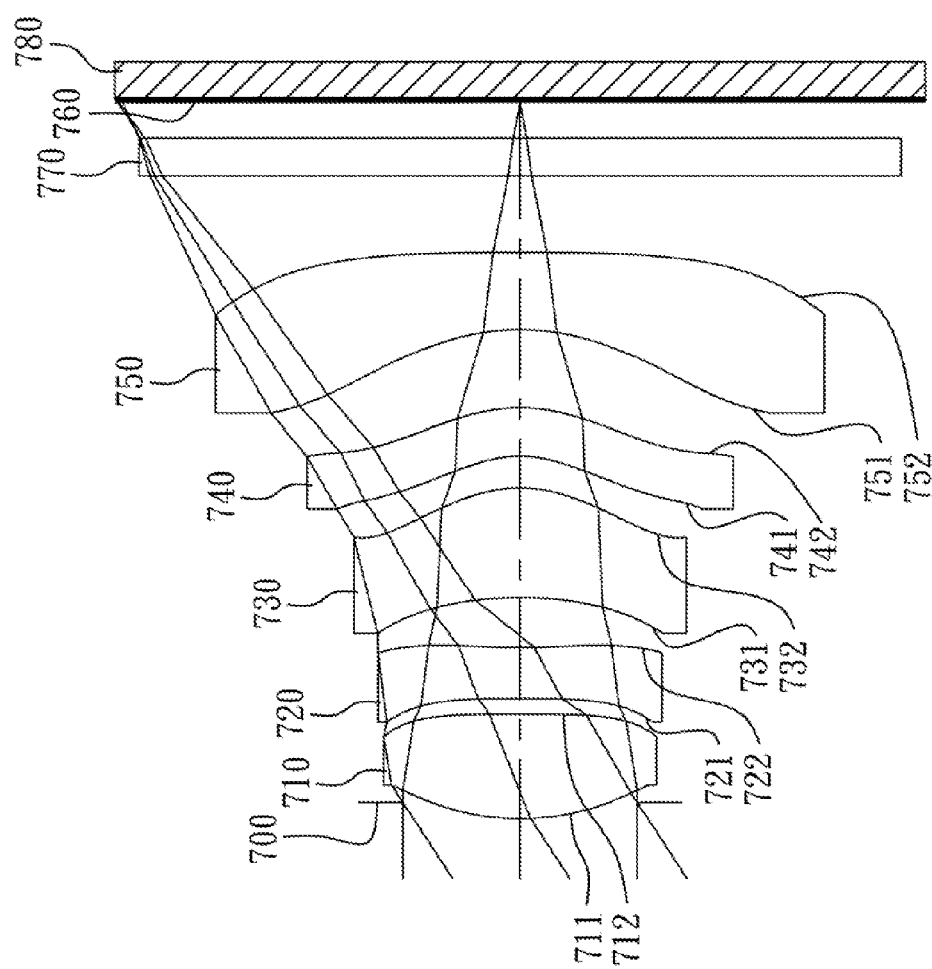
FIG. 13 is a schematic view of a monofocal optical lens system according to the 7th embodiment of the present disclosure.
Figure 14:
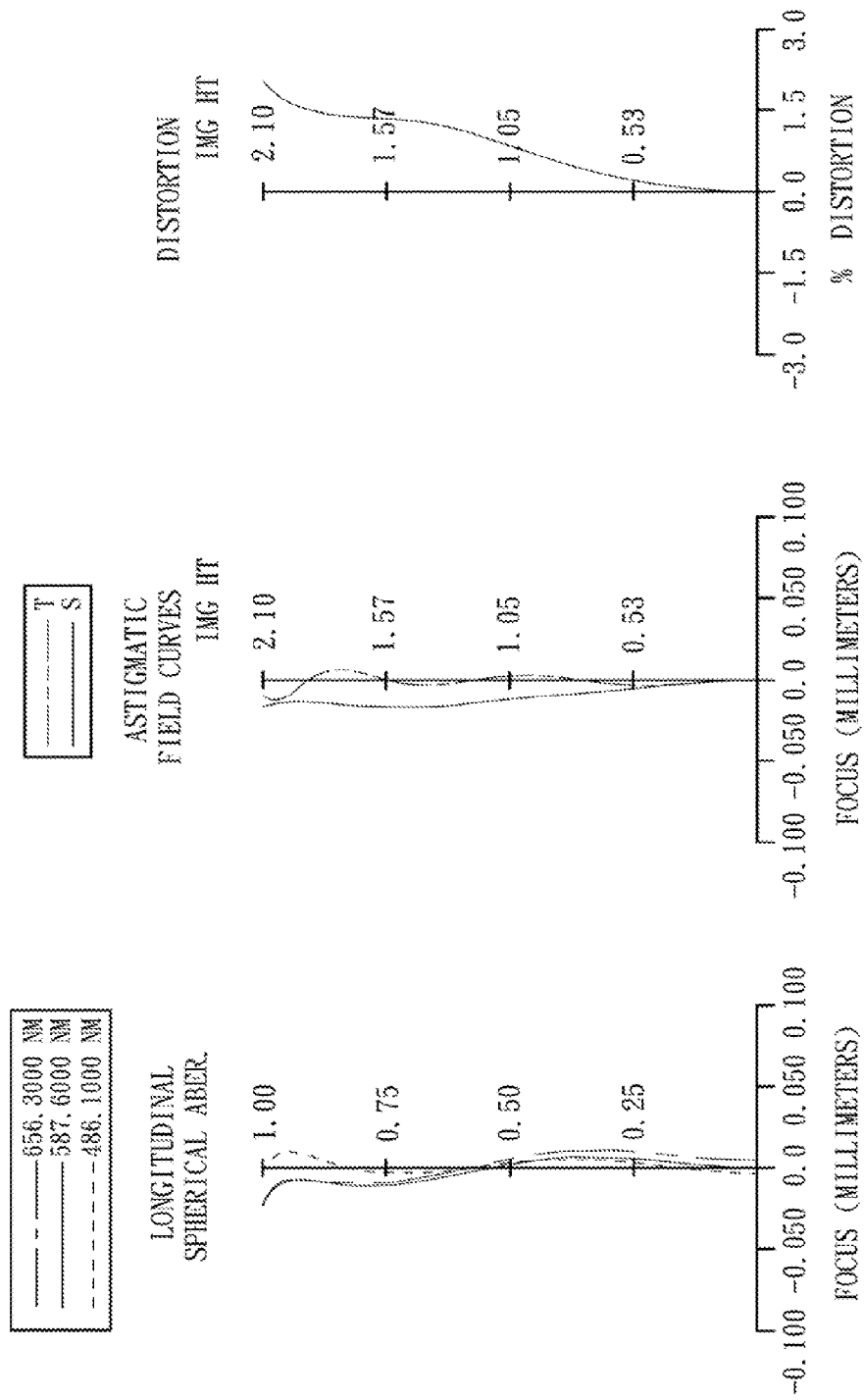
FIG. 14 shows spherical aberration curves, astigmatic field curves and a distortion curve of the monofocal optical lens system according to the 7th embodiment.

FIG. 13 is a schematic view of a monofocal optical lens system according to the 7th embodiment of the present disclosure. FIG. 14 shows spherical aberration curves, astigmatic field curves and a distortion curve of the monofocal optical lens system according to the 7th embodiment. In FIG. 13, the monofocal optical lens system includes, in order from an object side to an image side, an aperture stop 700, the first lens element 710, the second lens element 720, the third lens element 730, the fourth lens element 740, the fifth lens element 750, an IR-cut filter 770, an image plane 760 and an image sensor 780.

The first lens element 710 with positive refractive power has a convex object-side surface 711 and a convex image-side surface 712, and is made of plastic material. The object-side surface 711 and the image-side surface 712 of the first lens element 710 are aspheric.

The second lens element 720 with negative refractive power has a concave object-side surface 721 and a concave image-side surface 722, and is made of plastic material. The object-side surface 721 and the image-side surface 722 of the second lens element 720 are aspheric.

The third lens element 730 with positive refractive power has a concave object-side surface 731 and a convex image-side surface 732, and is made of plastic material. The object-side surface 731 and the image-side surface 732 of the third lens element 730 are aspheric.

The fourth lens element 740 with negative refractive power has a concave object-side surface 741 and a convex image-side surface 742, and is made of plastic material. The object-side surface 741 and the image-side surface 742 of the fourth lens element 740 are aspheric.

The fifth lens element 750 with negative refractive power has a concave object-side surface 751 and a convex image-side surface 752, and is made of plastic material. The object-side surface 751 and the image-side surface 752 of the fifth lens element 750 are aspheric. Furthermore, the image-side 752 of the fifth lens element 750 is convex at the paraxial region and the peripheral region thereof.

The IR-cut filter 770 is made of glass, and located between the fifth lens element 750 and the image plane 760, and will not affect the focal length of the monofocal optical lens system.

The detailed optical data of the 7th embodiment are shown in Table 13 and the aspheric surface data are shown in Table 14 below.

TABLE 13

7th Embodiment
f = 3.18 mm, Fno = 2.60, HFOV = 33.0 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.085 | | | | |
| 2 | Lens 1 | 1.290 (ASP) | 0.543 | Plastic | 1.544 | 55.9 | 2.29 |
| 3 | | −32.516 (ASP) | 0.083 | | | | |
| 4 | Lens 2 | −26.900 (ASP) | 0.266 | Plastic | 1.650 | 21.4 | −6.21 |
| 5 | | 4.767 (ASP) | 0.259 | | | | |
| 6 | Lens 3 | −2.114 (ASP) | 0.572 | Plastic | 1.544 | 55.9 | 1.66 |
| 7 | | −0.693 (ASP) | 0.168 | | | | |
| 8 | Lens 4 | −0.600 (ASP) | 0.250 | Plastic | 1.640 | 23.3 | −5.08 |
| 9 | | −0.855 (ASP) | 0.410 | | | | |
| 10 | Lens 5 | −1.196 (ASP) | 0.399 | Plastic | 1.544 | 55.9 | −2.28 |
| 11 | | −38.461 (ASP) | 0.400 | | | | |
| 12 | IR-cut filter | Plano | 0.200 | Glass | 1.517 | 64.2 | — |
| 13 | | Plano | 0.197 | | | | |
| 14 | Image | Plano | — | | | | |

Note:
Reference wavelength (d-line) is 587.6 nm.

TABLE 14

Aspheric Coefficients

| | Surface # | | | | |
|---|---|---|---|---|---|
| | 2 | 3 | 4 | 5 | 6 |
| k = | 3.4911E−02 | −1.0000E+00 | −1.0000E+00 | 2.9661E+00 | 1.9105E+00 |
| A4 = | −1.7325E−02 | −2.8497E−01 | −5.2426E−01 | −3.3742E−01 | −2.2922E−01 |
| A6 = | 1.0326E−01 | −1.3869E−02 | 3.7889E−01 | 3.0840E−01 | 2.9793E−01 |
| A8 = | −5.8894E−01 | −5.1011E−01 | −1.4628E+00 | −6.7740E−01 | 1.2007E−01 |
| A10 = | 9.4208E−01 | −4.4222E−01 | 1.5499E+00 | 1.5954E−01 | −5.6197E−01 |
| A12 = | −6.1037E−01 | 1.2908E+00 | 4.0778E−01 | 1.1102E+00 | −1.2634E+00 |
| A14 = | −1.6699E+00 | −1.2066E+00 | −4.7902E−01 | −9.8384E−01 | 3.3190E+00 |
| A16 = | | | | | −2.4223E+00 |

| | Surface # | | | | |
|---|---|---|---|---|---|
| | 7 | 8 | 9 | 10 | 11 |
| k = | −5.0743E−01 | −2.1012E+00 | −1.7534E+00 | −1.9629E+00 | −1.0000E+00 |
| A4 = | 7.4315E−01 | 7.4176E−01 | 3.8380E−01 | −3.8610E−02 | −6.1734E−02 |
| A6 = | −1.6136E−01 | −8.7614E−01 | −2.7668E−01 | 1.0374E−01 | 4.3340E−02 |
| A8 = | 1.6106E−01 | 7.9648E−01 | 1.8707E−01 | −8.8898E−02 | −3.7275E−02 |
| A10 = | 3.7553E−01 | −6.2158E−01 | 4.5549E−02 | 4.6410E−02 | 1.4132E−02 |
| A12 = | −2.5947E−01 | 2.1502E−01 | −8.4058E−02 | 2.3549E−02 | −1.5749E−03 |
| A14 = | 2.0093E−01 | 1.8290E−01 | −4.6003E−02 | −3.0954E−02 | −5.6401E−04 |
| A16 = | 3.0850E−02 | −1.9950E−01 | 3.5297E−02 | 7.5269E−03 | 1.4881E−04 |

In the monofocal optical lens system according to the 7th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 7th embodiment. Moreover, these parameters can be calculated from Table 13 and Table 14 as the following values and satisfy the following relationships:

| | | | |
|---|---|---|---|
| f (mm) | 3.18 | TD (mm) | 2.95 |
| Fno | 2.60 | (R5 + R6)/(R5 − R6) | 1.98 |
| HFOV (deg.) | 33.0 | R9/R10 | 0.03 |
| V1/V2 | 2.61 | f5/f4 | 0.45 |
| ΣCT/TD | 0.69 | TTL/ImgH | 1.75 |
| Dr1s/Dr1r4 | 0.10 | | |

8th Embodiment

Figure 15:
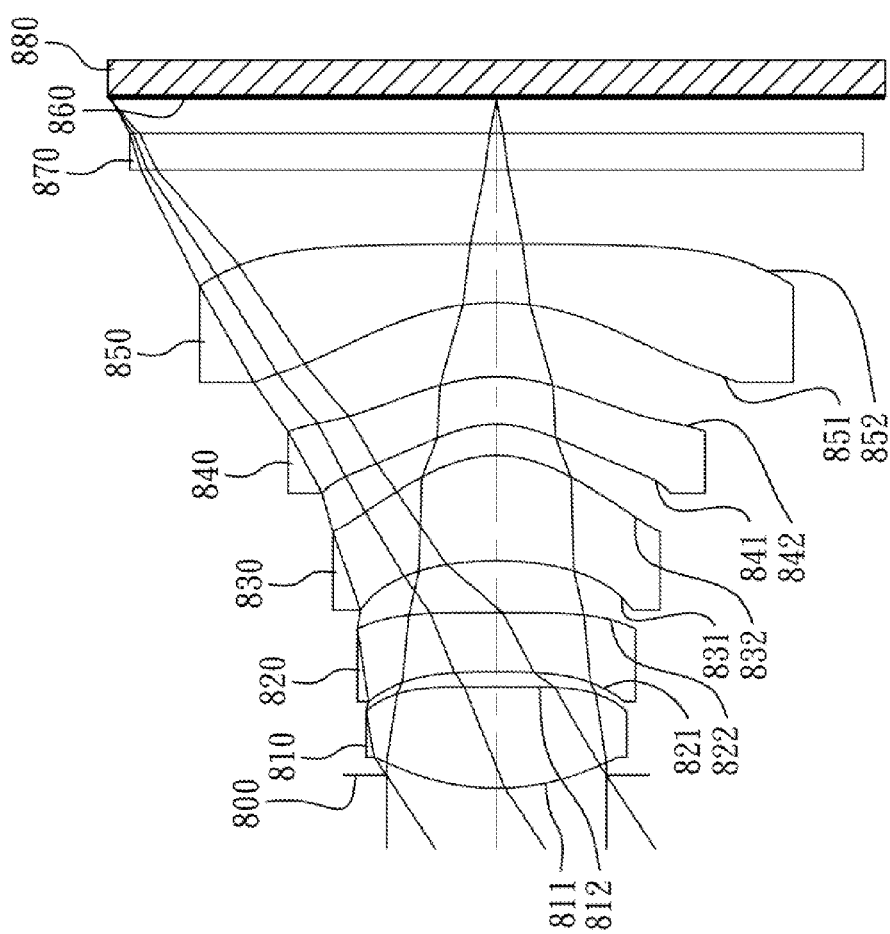
FIG. 15 is a schematic view of a monofocal optical lens system according to the 8th embodiment of the present disclosure.
Figure 16:
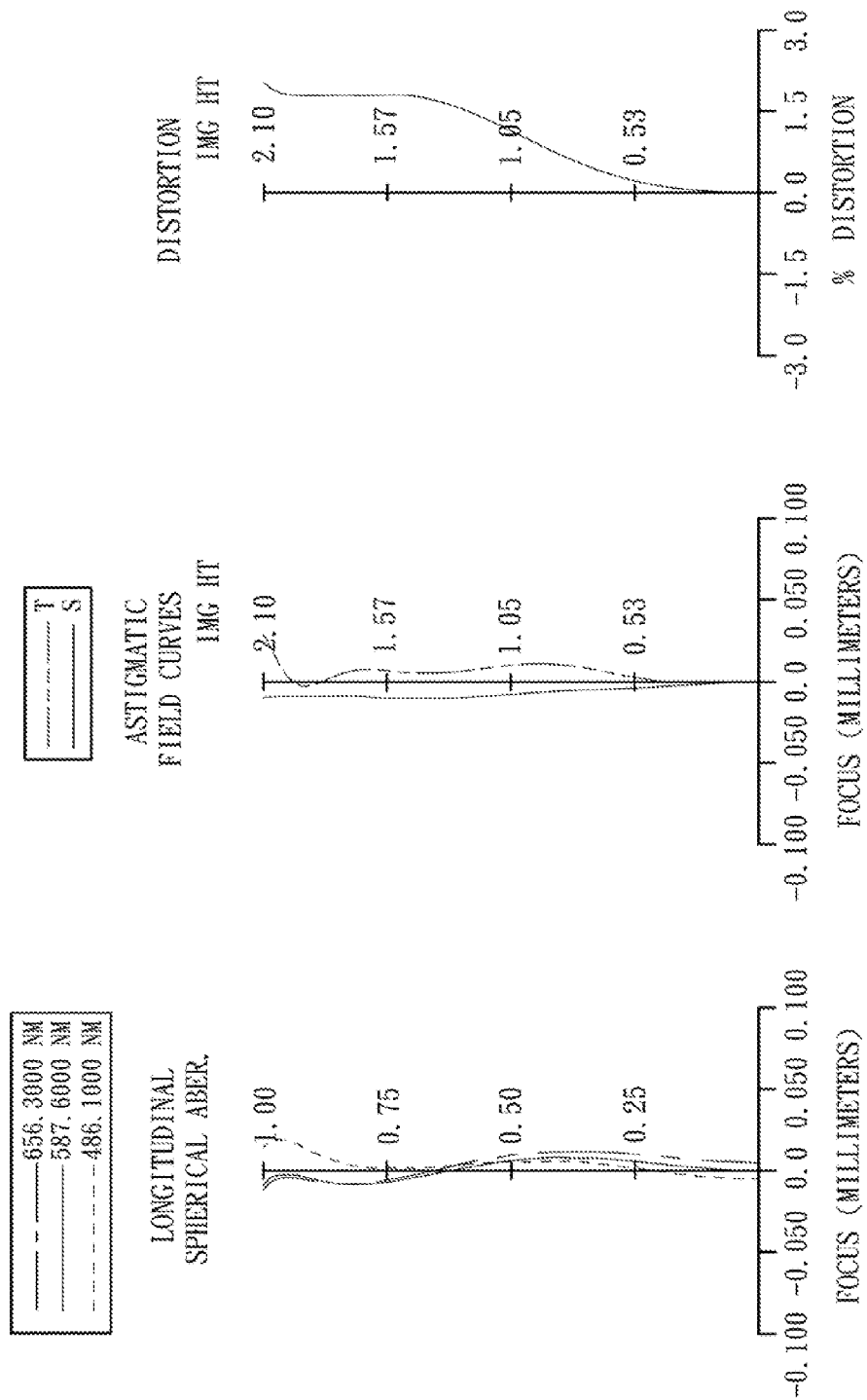
FIG. 16 shows spherical aberration curves, astigmatic field curves and a distortion curve of the monofocal optical lens system according to the 8th embodiment.

FIG. 15 is a schematic view of a monofocal optical lens system according to the 8th embodiment of the present disclosure. FIG. 16 shows spherical aberration curves, astigmatic field curves and a distortion curve of the monofocal optical lens system according to the 8th embodiment. In FIG. 15, the monofocal optical lens system includes, in order from an object side to an image side, an aperture stop 800, the first lens element 810, the second lens element 820, the third lens element 830, the fourth lens element 840, the fifth lens element 850, an IR-cut filter 870, an image plane 860 and an image sensor 880.

The first lens element 810 with positive refractive power has a convex object-side surface 811 and a concave image-side surface 812, and is made of plastic material. The object-side surface 811 and the image-side surface 812 of the first lens element 810 are aspheric.

The second lens element 820 with negative refractive power has a concave object-side surface 821 and a convex image-side surface 822, and is made of plastic material. The object-side surface 821 and the image-side surface 822 of the second lens element 820 are aspheric.

The third lens element 830 with positive refractive power has a concave object-side surface 831 and a convex image-side surface 832, and is made of plastic material. The object-side surface 831 and the image-side surface 832 of the third lens element 830 are aspheric.

The fourth lens element 840 with negative refractive power has a concave object-side surface 841 and a convex image-side surface 842, and is made of plastic material. The object-side surface 841 and the image-side surface 842 of the fourth lens element 840 are aspheric.

The fifth lens element 850 with negative refractive power has a concave object-side surface 851 and a convex image-side surface 852, and is made of plastic material. The object-side surface 851 and the image-side surface 852 of the fifth lens element 850 are aspheric. Furthermore, the image-side 852 of the fifth lens element 850 is convex at the paraxial region and the peripheral region thereof.

The IR-cut filter 870 is made of glass, and located between the fifth lens element 850 and the image plane 860, and will not affect the focal length of the monofocal optical lens system.

The detailed optical data of the 8th embodiment are shown in Table 15 and the aspheric surface data are shown in Table 16 below.

TABLE 15

8th Embodiment
f = 3.10 mm, Fno = 2.60, HFOV = 33.6 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.070 | | | | |
| 2 | Lens 1 | 1.304 (ASP) | 0.548 | Plastic | 1.544 | 55.9 | 2.44 |
| 3 | | 58.823 (ASP) | 0.083 | | | | |
| 4 | Lens 2 | −5.901 (ASP) | 0.323 | Plastic | 1.650 | 21.4 | −9.93 |
| 5 | | −70.771 (ASP) | 0.279 | | | | |
| 6 | Lens 3 | −1.878 (ASP) | 0.571 | Plastic | 1.544 | 55.9 | 1.49 |
| 7 | | −0.625 (ASP) | 0.169 | | | | |
| 8 | Lens 4 | −0.594 (ASP) | 0.259 | Plastic | 1.640 | 23.3 | −3.40 |
| 9 | | −0.957 (ASP) | 0.403 | | | | |
| 10 | Lens 5 | −1.251 (ASP) | 0.315 | Plastic | 1.544 | 55.9 | −2.38 |
| 11 | | −38.461 (ASP) | 0.400 | | | | |
| 12 | IR-cut filter | Plano | 0.200 | Glass | 1.517 | 64.2 | — |
| 13 | | Plano | 0.200 | | | | |
| 14 | Image | Plano | — | | | | |

Note:
Reference wavelength (d-line) is 587.6 nm.

TABLE 16

Aspheric Coefficients

| | Surface # | | | | |
|---|---|---|---|---|---|
| | 2 | 3 | 4 | 5 | 6 |
| k = | −1.9512E−01 | −1.0000E+00 | −1.0000E+00 | −2.0000E+01 | 2.2862E+00 |
| A4 = | −8.7327E−03 | −3.8184E−01 | −5.5094E−01 | −2.7895E−01 | −3.2312E−01 |
| A6 = | 7.5179E−02 | −8.3684E−02 | 3.2405E−01 | 3.3968E−01 | 5.4658E−01 |
| A8 = | −4.1019E−01 | −7.3408E−01 | −1.5421E+00 | −5.6724E−01 | −5.4372E−01 |

TABLE 16-continued

| Aspheric Coefficients | | | | | |
|---|---|---|---|---|---|
| A10 = | 6.6304E−01 | 1.3446E−01 | 1.9993E+00 | −3.0945E−01 | −7.4487E−01 |
| A12 = | −6.1037E−01 | 1.2908E+00 | 4.0778E−01 | 1.1102E+00 | −1.2634E+00 |
| A14 = | −1.6699E+00 | −1.2066E+00 | −4.7902E−01 | −9.8384E−01 | 3.3190E+00 |
| A16 = | | | | | −2.4223E+00 |

| | Surface # | | | | |
|---|---|---|---|---|---|
| | 7 | 8 | 9 | 10 | 11 |
| k = | −5.8999E−01 | −1.9706E+00 | −1.2762E+00 | −1.4915E+00 | −1.0000E+00 |
| A4 = | 7.5461E−01 | 7.0742E−01 | 3.5227E−01 | 4.3533E−03 | −8.4547E−03 |
| A6 = | −2.3044E−01 | −9.6080E−01 | −2.6960E−01 | 1.0374E−01 | 1.1471E−02 |
| A8 = | 8.2978E−02 | 8.2171E−01 | 1.9411E−01 | −1.0020E−01 | −2.8764E−02 |
| A10 = | 2.6113E−01 | −5.7430E−01 | 4.2681E−02 | 4.5273E−02 | 1.4342E−02 |
| A12 = | −2.9219E−01 | 2.0314E−01 | −8.4395E−02 | 2.3989E−02 | −1.7449E−03 |
| A14 = | 1.4871E−01 | 1.5161E−01 | −4.5579E−02 | −3.0577E−02 | −6.0518E−04 |
| A16 = | 3.3194E−01 | −2.3015E−01 | 3.6588E−02 | 7.5336E−03 | 1.4191E−04 |

In the monofocal optical lens system according to the 8th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 8th embodiment. Moreover, these parameters can be calculated from Table 15 and Table 16 as the following values and satisfy the following relationships:

| f (mm) | 3.10 | TD (mm) | 2.95 |
|---|---|---|---|
| Fno | 2.60 | (R5 + R6)/(R5 − R6) | 2.00 |
| HFOV (deg.) | 33.6 | R9/R10 | 0.03 |
| V1/V2 | 2.61 | f5/f4 | 0.70 |
| ΣCT/TD | 0.68 | TTL/ImgH | 1.75 |
| Dr1s/Dr1r4 | 0.07 | | |

9th Embodiment

Figure 17:
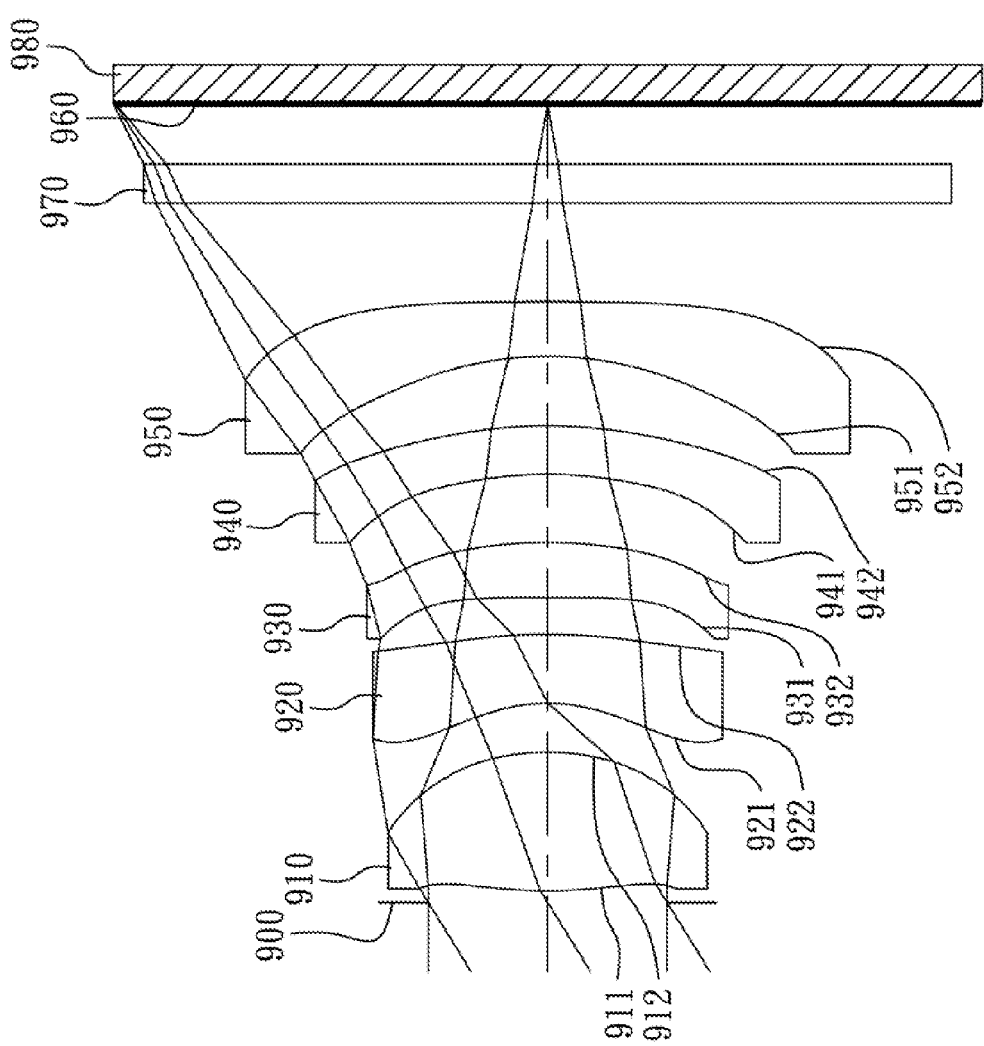
FIG. 17 is a schematic view of a monofocal optical lens system according to the 9th embodiment of the present disclosure.
Figure 18:
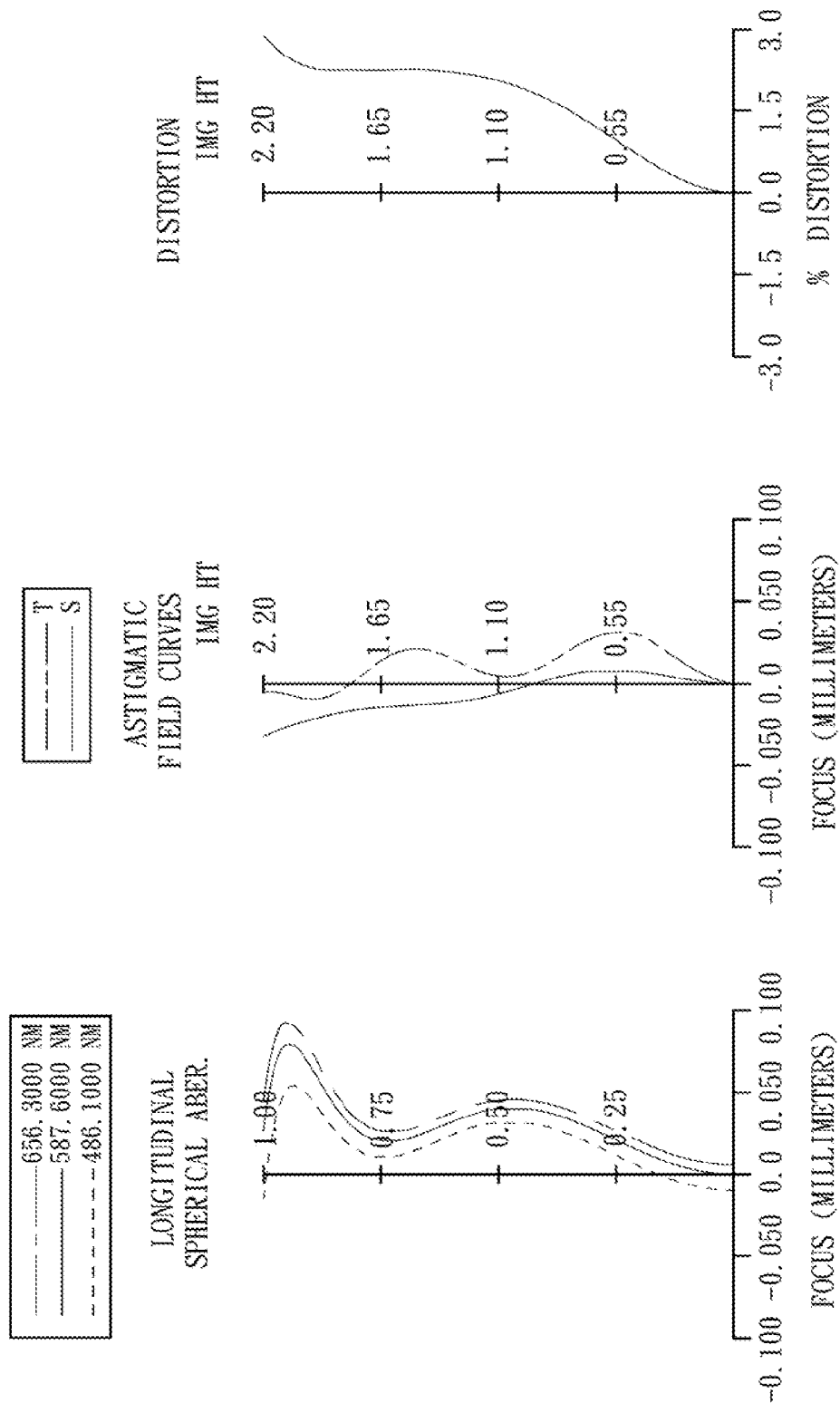
FIG. 18 shows spherical aberration curves, astigmatic field curves and a distortion curve of the monofocal optical lens system according to the 9th embodiment.

FIG. 17 is a schematic view of a monofocal optical lens system according to the 9th embodiment of the present disclosure. FIG. 18 shows spherical aberration curves, astigmatic field curves and a distortion curve of the monofocal optical lens system according to the 9th embodiment. In FIG. 17, the monofocal optical lens system includes, in order from an object side to an image side, an aperture stop 900, the first lens element 910, the second lens element 920, the third lens element 930, the fourth lens element 940, the fifth lens element 950, an IR-cut filter 970, an image plane 960 and an image sensor 980.

The first lens element 910 with positive refractive power has a convex object-side surface 911 and a convex image-side surface 912, and is made of plastic material. The object-side surface 911 and the image-side surface 912 of the first lens element 910 are aspheric.

The second lens element 920 with negative refractive power has a concave object-side surface 921 and a convex image-side surface 922, and is made of plastic material. The object-side surface 921 and the image-side surface 922 of the second lens element 920 are aspheric.

The third lens element 930 with positive refractive power has a concave object-side surface 931 and a convex image-side surface 932, and is made of plastic material. The object-side surface 931 and the mage-side surface 932 of the third lens element 930 are aspheric.

The fourth lens element 940 with negative refractive power has a concave object-side surface 941 and a convex image-side surface 942, and is made of plastic material. The object-side surface 941 and the image-side surface 942 of the fourth lens element 940 are aspheric.

The fifth lens element 950 with negative refractive power has a concave object-side surface 951 and a convex image-side surface 952, and is made of plastic material. The object-side surface 951 and the image-side surface 952 of the fifth lens element 950 are aspheric. Furthermore, the image-side 952 of the fifth lens element 950 is convex at the paraxial region and the peripheral region thereof.

The IR-cut filter 970 is made of glass, and located between the fifth lens element 950 and the image plane 960, and will not affect the focal length of the monofocal optical lens system.

The detailed optical data of the 9th embodiment are shown in Table 17 and the aspheric surface data are shown in Table 18 below.

TABLE 17

9th Embodiment
f = 3.40 mm, Fno = 2.80, HFOV = 31.9 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | 0.060 | | | | |
| 2 | Lens 1 | 2.414 (ASP) | 0.705 | Plastic | 1.544 | 55.9 | 1.59 |
| 3 | | −1.203 (ASP) | 0.249 | | | | |
| 4 | Lens 2 | −0.861 (ASP) | 0.350 | Plastic | 1.640 | 23.3 | −2.01 |
| 5 | | −3.033 (ASP) | 0.188 | | | | |
| 6 | Lens 3 | −38.029 (ASP) | 0.284 | Plastic | 1.640 | 23.3 | 3.53 |
| 7 | | −2.135 (ASP) | 0.344 | | | | |
| 8 | Lens 4 | −1.948 (ASP) | 0.250 | Plastic | 1.535 | 56.3 | −28.38 |

TABLE 17-continued

9th Embodiment
f = 3.40 mm, Fno = 2.80, HFOV = 31.9 deg.

| Surface # | | Curvature Radius | Thickness | Material | Index | Abbe # | Focal length |
|---|---|---|---|---|---|---|---|
| 9 | | −2.335 (ASP) | 0.350 | | | | |
| 10 | Lens 5 | −1.853 (ASP) | 0.280 | Plastic | 1.535 | 56.3 | −3.72 |
| 11 | | −28.571 (ASP) | 0.500 | | | | |
| 12 | IR-cut filter | Plano | 0.200 | Glass | 1.517 | 64.2 | — |
| 13 | | Plano | 0.307 | | | | |
| 14 | Image | Plano | — | | | | |

Note:
Reference wavelength (d-line) is 587.6 nm.

TABLE 18

Aspheric Coefficients

| Surface # | | | | | |
|---|---|---|---|---|---|
| | 2 | 3 | 4 | 5 | 6 |
| k = | −6.8652E+00 | −1.0000E+00 | −2.3975E+00 | −4.0755E+00 | −1.0000E+00 |
| A4 = | −1.5064E−01 | −1.9159E−01 | 6.9327E−03 | −1.5547E−02 | −2.1365E−01 |
| A6 = | −1.4880E−01 | −2.1965E−01 | 4.5723E−01 | 2.3051E−01 | −2.3127E−01 |
| A8 = | −5.7989E−01 | 5.0795E−01 | −1.0035E−01 | −2.0310E−01 | −2.1856E−01 |
| A10 = | −6.7705E−01 | −7.3277E−01 | −7.3462E−02 | 1.0310E−01 | 3.0824E−01 |
| A12 = | −4.6832E−01 | 2.0970E−02 | 3.4088E−02 | −1.0543E−01 | −9.4730E−02 |
| A14 = | | | | | 7.1897E−02 |
| A16 = | | | | | 1.6716E−02 |

| Surface # | | | | | |
|---|---|---|---|---|---|
| | 7 | 8 | 9 | 10 | 11 |
| k = | −2.0000E+01 | −1.3916E+00 | 3.9631E−01 | −7.2195E−01 | −1.0000E+00 |
| A4 = | −5.7592E−02 | 1.9311E−01 | 8.0093E−02 | −6.0488E−02 | −2.8715E−02 |
| A6 = | −2.5000E−01 | −3.9007E−01 | −3.2415E−02 | 7.7455E−02 | −2.5760E−02 |
| A8 = | −1.7346E−02 | 8.3446E−02 | −2.6954E−03 | −7.1064E−03 | 1.2660E−02 |
| A10 = | 1.7893E−02 | −7.7148E−02 | −7.7952E−03 | −1.3031E−02 | −2.9308E−03 |
| A12 = | 2.6986E−01 | 1.0334E−01 | 4.6374E−03 | −2.2614E−03 | −2.1531E−04 |

In the monofocal optical lens system according to the 9th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 9th embodiment. Moreover, these parameters can be calculated from Table 17 and Table 18 as the following values and satisfy the following relationships:

| f (mm) | 3.40 | TD (mm) | 3.00 |
|---|---|---|---|
| Fno | 2.80 | (R5 + R6)/(R5 − R6) | 1.12 |
| HFOV (deg.) | 31.9 | R9/R10 | 0.06 |
| V1/V2 | 2.40 | f5/f4 | 0.13 |
| ΣCT/TD | 0.62 | TTL/ImgH | 1.79 |
| Dr1s/Dr1r4 | −0.05 | | |

10th Embodiment

Figure 19:
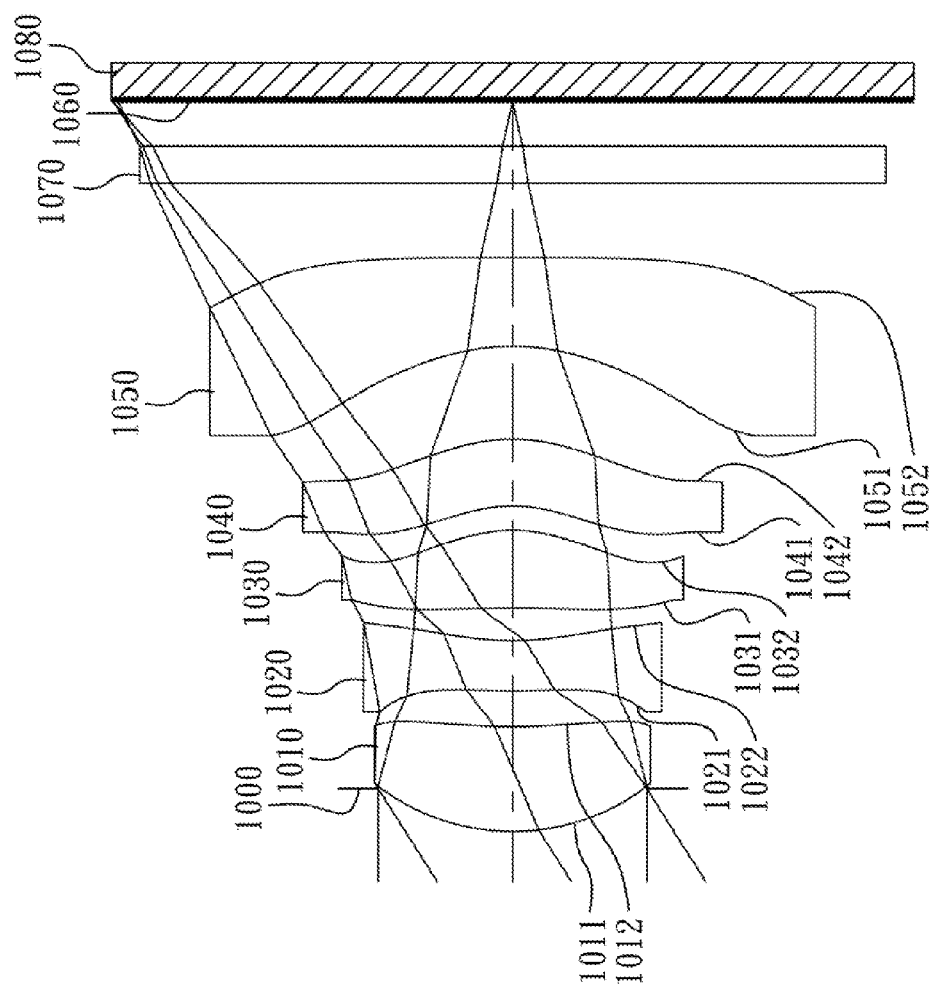
FIG. 19 is a schematic view of a monofocal optical lens system according to the 10th embodiment of the present disclosure.
Figure 20:
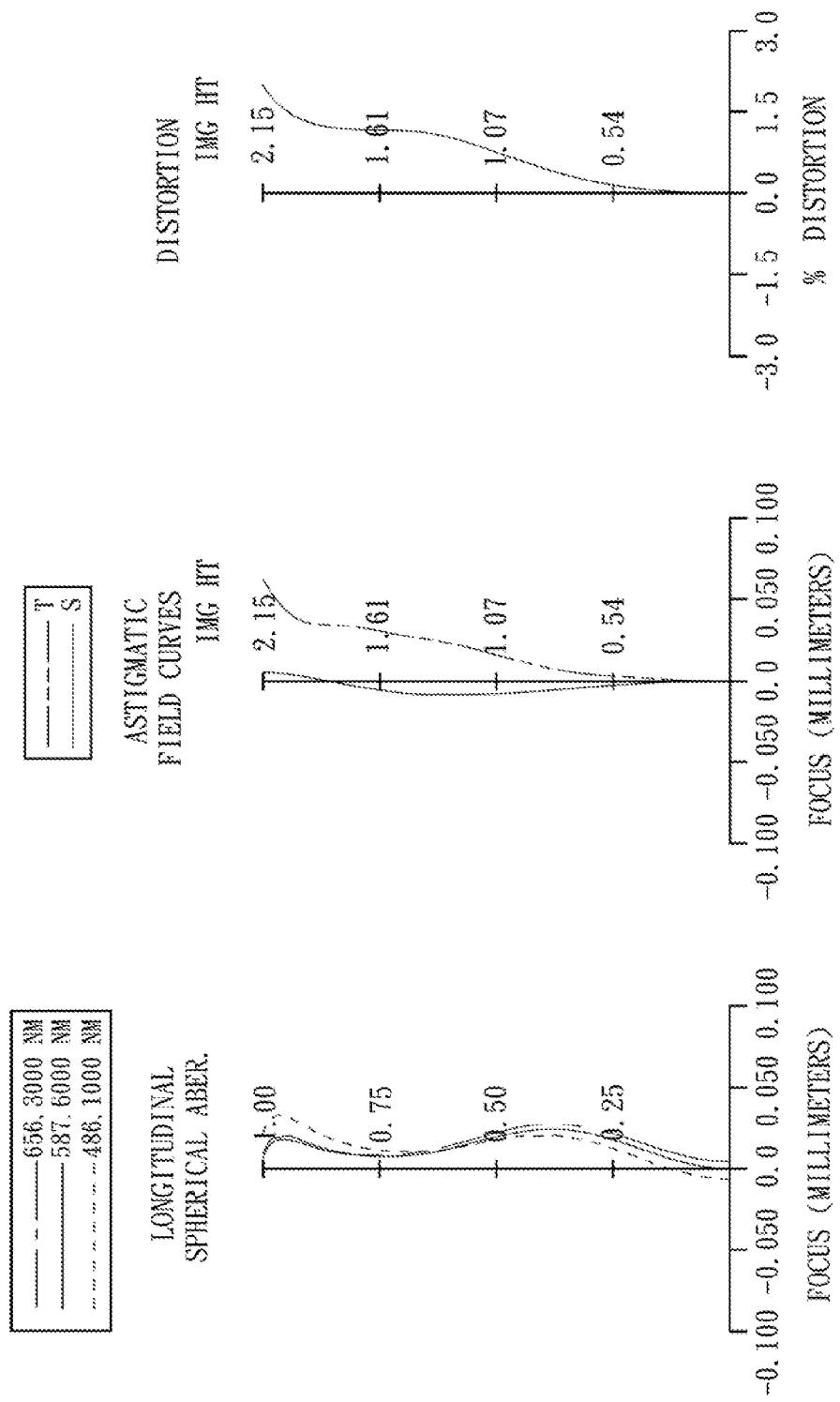
FIG. 20 shows spherical aberration curves, astigmatic field curves and a distortion curve of the monofocal optical lens system according to the 10th embodiment.

FIG. 19 is a schematic view of a monofocal optical lens system according to the 10th embodiment of the present disclosure. FIG. 20 shows spherical aberration curves, astigmatic field curves and a distortion curve of the monofocal optical lens system according to the 10th embodiment. In FIG. 19, the monofocal optical lens system includes, in order from an object side to an image side, an aperture stop 1000, the first lens element 1010, the second lens element 1020, the third lens element 1030, the fourth lens element 1040, the fifth lens element 1050, an IR-cut filter 1070, an image plane 1060 and an image sensor 1080.

The first lens element 1010 with positive refractive power has a convex object-side surface 1011 and a concave image-side surface 1012, and is made of plastic material. The object-side surface 1011 and the image-side surface 1012 of the first lens element 1010 are aspheric.

The second lens element 1020 with negative refractive power has a convex object-side surface 1021 and a concave image-side surface 1022, and is made of plastic material. The object-side surface 1021 and the image-side surface 1022 of the second lens element 1020 are aspheric.

The third lens element 1030 with positive refractive power has a concave object-side surface 1031 and a convex image-side surface 1032, and is made of plastic material. The object-side surface 1031 and the image-side surface 1032 of the third lens element 1030 are aspheric.

The fourth lens element 1040 with negative refractive power has a concave object-side surface 1041 and a convex image-side surface 1042, and is made of plastic material. The object-side surface 1041 and the image-side surface 1042 of the fourth lens element 1040 are aspheric.

The fifth lens element 1050 with negative refractive power has a concave object-side surface 1051 and an image-side surface 1052 which is planar at the paraxial region and is convex at the peripheral region thereof. The fifth lens element 1050 is made of plastic material. The object-side surface 1051 and the image-side surface 1052 of the fifth lens element 1050 are aspheric.

The IR-cut filter 1070 is made of glass, and located between the fifth lens element 1050 and the image plane 1060, and will not affect the focal length of the monofocal optical lens system.

The detailed optical data of the 10th embodiment are shown in Table 19 to and the aspheric surface data are shown in Table 20 below.

| f (mm) | 3.32 | TD (mm) | 3.08 |
|---|---|---|---|
| Fno | 2.30 | (R5 + R6)/(R5 − R6) | 1.18 |
| HFOV (deg.) | 32.3 | R9/R10 | 0.00 |
| V1/V2 | 2.40 | f5/f4 | 0.11 |
| ΣCT/TD | 0.68 | TTL/ImgH | 1.80 |
| Dr1s/Dr1r4 | 0.22 | | |

TABLE 19

10th Embodiment
f = 3.32 mm, Fno = 2.30, HFOV = 32.3 deg.

| Surface # | | Curvature Radius | Thickness | Material | Index | Abbe # | Focal length |
|---|---|---|---|---|---|---|---|
| 0 | Object | Plano | Infinity | | | | |
| 1 | Ape. Stop | Plano | −0.229 | | | | |
| 2 | Lens 1 | 1.222 (ASP) | 0.565 | Plastic | 1.544 | 55.9 | 3.04 |
| 3 | | 3.905 (ASP) | 0.191 | | | | |
| 4 | Lens 2 | 4.331 (ASP) | 0.272 | Plastic | 1.640 | 23.3 | −4.06 |
| 5 | | 1.584 (ASP) | 0.172 | | | | |
| 6 | Lens 3 | −9.701 (ASP) | 0.421 | Plastic | 1.544 | 55.9 | 1.57 |
| 7 | | −0.796 (ASP) | 0.131 | | | | |
| 8 | Lens 4 | −0.760 (ASP) | 0.355 | Plastic | 1.640 | 23.3 | −19.38 |
| 9 | | −0.957 (ASP) | 0.500 | | | | |
| 10 | Lens 5 | −1.191 (ASP) | 0.476 | Plastic | 1.544 | 55.9 | −2.19 |
| 11 | | ∞ (ASP) | 0.400 | | | | |
| 12 | IR-cut filter | Plano | 0.200 | Glass | 1.517 | 64.2 | — |
| 13 | | Plano | 0.249 | | | | |
| 14 | Image | Plano | — | | | | |

Note:
Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | 2.1192E−01 | 5.1611E−01 | −2.0000E+01 | −8.4038E−01 | −1.0000E+00 |
| A4 = | −1.5519E−02 | −1.3115E−01 | −6.4461E−01 | −4.1665E−01 | 4.6830E−04 |
| A6 = | 1.6082E−01 | −8.5401E−05 | 3.5622E−01 | 4.0864E−01 | 4.1621E−01 |
| A8 = | −5.1024E−01 | 1.0426E−01 | −1.1973E+00 | −4.1033E−01 | −5.7889E−02 |
| A10 = | 8.7947E−01 | −8.4881E−01 | 1.0699E+00 | −2.9789E−01 | −4.3098E−01 |
| A12 = | −4.8148E−01 | 4.1093E−01 | 4.5299E−01 | 9.4071E−01 | −1.1999E+00 |
| A14 = | −2.5526E−01 | −5.8443E−01 | −1.2299E+00 | −1.2521E−01 | 3.45584E+00 |
| A16 = | | | | | −2.1947E+00 |

| | Surface # | | | | |
|---|---|---|---|---|---|
| | 7 | 8 | 9 | 10 | 11 |
| k = | −6.2424E−01 | −2.0898E+00 | −1.0377E+00 | −4.3120E+00 | −1.0000E+00 |
| A4 = | 6.8473E−01 | 7.6667E−01 | 3.7320E−01 | −1.0708E−01 | −4.3022E−02 |
| A6 = | −1.5513E−01 | −8.1830E−01 | −2.0792E−01 | 1.0374E−01 | 2.3964E−02 |
| A8 = | 1.6406E−01 | 8.5486E−01 | 1.7355E−01 | −1.1503E−01 | −2.9141E−02 |
| A10 = | 3.0853E−01 | −6.5767E−01 | 4.4947E−02 | 5.6438E−02 | 1.3299E−02 |
| A12 = | −3.9661E−01 | 1.3788E−01 | −8.1593E−02 | 2.9625E−02 | −1.6211E−03 |
| A14 = | 1.3289E−01 | 1.8381E−01 | −4.4071E−02 | −2.9793E−02 | −5.7057E−04 |
| A16 = | −9.6026E−02 | −1.1976E−01 | 3.3142E−02 | 6.1109E−03 | 1.5325E−04 |

In the monofocal optical lens system according to the 10th embodiment, the definitions of f, Fno, FOV, V1, V2, ΣCT, TD, Dr1s, Dr1r4, R5, R6, R9, R10, f4, f5, TTL and ImgH are the same as those stated in the 1st embodiment with corresponding values for the 10th embodiment. Moreover, these parameters can be calculated from Table 19 and Table 20 as the following values and satisfy the following relationships:

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A monofocal optical lens system comprising, in order from an object side to an image side:

a first lens element with positive refractive power having a convex object-side surface;
a second lens element with negative refractive power;
a third lens element with refractive power, wherein at least one of an object-side surface and an image-side surface of the third lens element is aspheric;
a fourth lens element with negative refractive power made of plastic material, and having a concave object-side surface and a convex image-side surface, wherein the object-side surface and the image-side surface of the fourth lens element are aspheric; and
a fifth lens element with refractive power made of plastic material, and having a concave object-side surface, wherein the object-side surface and an image-side surface of the fifth lens element are aspheric, the image-side surface of the fifth lens element is convex or planar at a paraxial region and is convex at a peripheral region;
wherein the monofocal optical lens system further comprises a stop, an axial distance between the object-side surface of the first lens element and the stop is Dr1s, an axial distance between the object-side surface of the first lens element and an image-side surface of the second lens element is Dr1r4, a curvature radius of the object-side surface of the fifth lens element is R9, a curvature radius of the image-side surface of the fifth lens element is R10, and the following relationships are satisfied:

$-0.2 < Dr1s/Dr1r4 < 0.9$; and $0 \leq R9/R10 < 0.30$.

2. The monofocal optical lens system of claim 1, wherein an axial distance between the object-side surface of the first lens element and an image plane is TTL, a maximum image height of the monofocal optical lens system is ImgH, and the following relationship is satisfied:

$TTL/ImgH < 2.0$.

3. The monofocal optical lens system of claim 2, wherein a focal length of the fourth lens element is f4, a focal length of the fifth lens element is f5, and the following relationship is satisfied:

$0 < f5/f4 < 0.80$.

4. The monofocal optical lens system of claim 2, wherein the object-side surface and the image-side surface of the first through third lens elements are aspheric, and the first through third lens elements are made of plastic material.

5. The monofocal optical lens system of claim 1, wherein the curvature radius of the object-side surface of the fifth lens element is R9, the curvature radius of the image-side surface of the fifth lens element is R10, and the following relationship is satisfied:

$0 \leq R9/R10 < 0.15$.

6. The monofocal optical lens system of claim 1, wherein a sum of the central thickness from the first through fifth lens elements is ΣCT, an axial distance between the object-side surface of the first lens element and the image-side surface of the fifth lens element is TD, and the following relationship is satisfied:

$0.55 < \Sigma CT/TD < 0.85$.

7. The monofocal optical lens system of claim 6, wherein the third lens element has a concave object-side surface and a convex mage-side surface.

8. The monofocal optical lens system of claim 6, wherein a focal length of the fourth lens element is f4, a focal length of the fifth lens element is f5, and the following relationship is satisfied:

$0 < f5/f4 < 0.50$.

9. The monofocal optical lens system of claim 6, wherein the axial distance between the object-side surface of the first lens element and the image-side surface of the fifth lens element is TD, and the following relationship is satisfied:

$2.5 \text{ mm} < TD < 3.8 \text{ mm}$.

10. The monofocal optical lens system of claim 1, wherein a curvature radius of the object-side surface of the third lens element is R5, a curvature radius of the image-side surface of the third lens element is R6, and the following relationship is satisfied:

$0.6 < (R5+R6)/(R5-R6) < 3.0$.

11. The monofocal optical lens system of claim 1, wherein the third lens element has positive refractive power, and the fifth lens element has negative refractive power.

12. The monofocal optical lens system of claim 11, wherein an Abbe number of the first lens element is V1, an Abbe number of the second lens element is V2, and the following relationship is satisfied:

$2.2 < V1/V2 < 3.0$.

13. The monofocal optical lens system of claim 11, wherein at least four lens elements of the first through fifth lens elements have a surface being concave at the paraxial region and the other surface being convex at the paraxial region.

14. A monofocal optical lens system comprising, in order from an object side to an image side:
a first lens element with positive refractive power having a convex object-side surface;
a second lens element with negative refractive power;
a third lens element with refractive power, wherein at least one of an object-side surface and an image-side surface of the third lens element is aspheric;
a fourth lens element with negative refractive power made of plastic material, and having a concave object-side surface and a convex image-side surface, wherein the object-side surface and the image-side surface of the fourth lens element are aspheric; and
a fifth lens element with refractive power made of plastic material, and having a concave object-side surface, wherein the object-side surface and an image-side surface of the fifth lens element are aspheric, the image-side surface of the fifth lens element is convex or planar at a paraxial region and is convex at a peripheral region;
wherein the monofocal optical lens system further comprises a stop, an axial distance between the object-side surface of the first lens element and the stop is Dr1s, an axial distance between the object-side surface of the first lens element and an image-side surface of the second lens element is Dr1r4, a curvature radius of the object-side surface of the third lens element is R5, a curvature radius of the image-side surface of the third lens element is R6, and the following relationships are satisfied:

$-0.2 < Dr1s/Dr1r4 < 0.9$; and $0.6 < (R5+R6)/(R5-R6) < 3.0$.

15. The monofocal optical lens system of claim 14, wherein an axial distance between the object-side surface of the first lens element and an image plane is TTL, a maximum image height of the monofocal optical lens system is ImgH, and the following relationship is satisfied:

$TTL/ImgH<2.0$.

16. The monofocal optical lens system of claim 15, wherein a focal length of the fourth lens element is f4, a focal length of the fifth lens element is f5, and the following relationship is satisfied:

$0<f5/f4<0.80$.

17. The monofocal optical lens system of claim 15, wherein a curvature radius of the object-side surface of the fifth lens element is R9, a curvature radius of the image-side surface of the fifth lens element is R10, and the following relationship is satisfied:

$0 \leq R9/R10<0.30$.

18. The monofocal optical lens system of claim 15, wherein the object-side surface and the image-side surface of the first through third lens elements are aspheric, and the first through third lens elements are made of plastic material.

19. The monofocal optical lens system of claim 15, wherein the third lens element has a concave object-side surface and a convex image-side surface, and the fifth lens element has negative refractive power.

20. The monofocal optical lens system of claim 15, wherein an axial distance between the object-side surface of the first lens element and the image-side surface of the fifth lens element is TD, and the following relationship is satisfied:

$2.5\ mm<TD<3.8\ mm$.

21. The monofocal optical lens system of claim 15, wherein an Abbe number of the first lens element is V1, an Abbe number of the second lens element is V2, and the following relationship is satisfied:

$2.2<V1/V2<3.0$.

* * * * *